US012576962B2

(12) United States Patent
English et al.

(10) Patent No.: US 12,576,962 B2
(45) **Date of Patent: \*Mar. 17, 2026**

(54) AIRCRAFT CONTROL SYSTEM AND METHOD

(71) Applicant: Joby Aero, Inc., Santa Cruz, CA (US)

(72) Inventors: Blake W. English, Santa Cruz, CA (US); James W. Denham, Santa Cruz, CA (US); Justin D. Paines, Wiltshire (GB)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,709

(22) Filed: Mar. 5, 2025

(65) Prior Publication Data

US 2025/0196997 A1 Jun. 19, 2025

Related U.S. Application Data

(63) Continuation of application No. 18/304,167, filed on Apr. 20, 2023, now Pat. No. 12,269,579, which is a continuation of application No. 17/340,476, filed on Jun. 7, 2021, now Pat. No. 11,673,649.

(60) Provisional application No. 63/035,416, filed on Jun. 5, 2020.

(51) Int. Cl.
| | |
|---|---|
| *B64C 13/04* | (2006.01) |
| *B64C 13/50* | (2006.01) |
| *G05D 1/00* | (2024.01) |
| *G05D 1/223* | (2024.01) |

(52) U.S. Cl.
CPC ........ *B64C 13/0421* (2018.01); *B64C 13/503* (2013.01); *G05D 1/0016* (2013.01); *G05D 1/223* (2024.01)

(58) Field of Classification Search
CPC .. B64C 13/0421; B64C 13/503; G05D 1/223; G05D 1/0016
See application file for complete search history.

(56) References Cited

U.S. PATENT DOCUMENTS

| | | | | | |
|---|---|---|---|---|---|
| 4,420,808 | A | * | 12/1983 | Diamond | ................ G01L 5/223 |
| | | | | | 701/4 |
| 5,472,156 | A | * | 12/1995 | Bivens, III | .............. B64C 27/56 |
| | | | | | 244/234 |
| 9,898,033 | B1 | * | 2/2018 | Long | .................. G05G 9/04792 |

(Continued)

OTHER PUBLICATIONS

"European Application Serial No. 21816957.1. Response to Communication pursuant to Rules 161(2) and 162 EPC mailed Jan. 18, 2023", 9 pgs.

(Continued)

*Primary Examiner* — Rodney A Bonnette
(74) *Attorney, Agent, or Firm* — SCHWEGMAN LUNDBERG & WOESSNER, P.A.

(57) ABSTRACT

The aircraft control system includes an inceptor with a set of primary inceptor axes and a set of secondary inceptor inputs. The inceptor can optionally include a hand rest, a thumb groove, a set of finger grooves, passive soft stops, and/or any other additional elements. The aircraft control system can optionally include a flight controller, aircraft sensors, effectors, and a haptic feedback mechanism. However, the aircraft control system can additionally or alternatively include any other suitable components.

20 Claims, 46 Drawing Sheets

(56)          References Cited

U.S. PATENT DOCUMENTS

| | | | |
|---|---|---|---|
| 2009/0178502 A1* | 7/2009 | Kern ....................... | G05G 5/03 |
| | | | 74/471 XY |
| 2009/0187292 A1* | 7/2009 | Hreha ................. | B64C 13/0421 |
| | | | 701/4 |
| 2013/0133469 A1* | 5/2013 | Rey .................... | B64C 13/0421 |
| | | | 74/558.5 |
| 2016/0085257 A1* | 3/2016 | Moehling ............... | G05G 1/06 |
| | | | 74/543 |

OTHER PUBLICATIONS

"European Application Serial No. 21816957.1, Response filed Dec. 6, 2024 to Extended European Search Report mailed May 31, 2024", w claims, 11 pgs.
"European Application Serial No. 21816957.1, Communication Pursuant to Article 943 EPC mailed Aug. 11, 2025", 5 pgs.

* cited by examiner

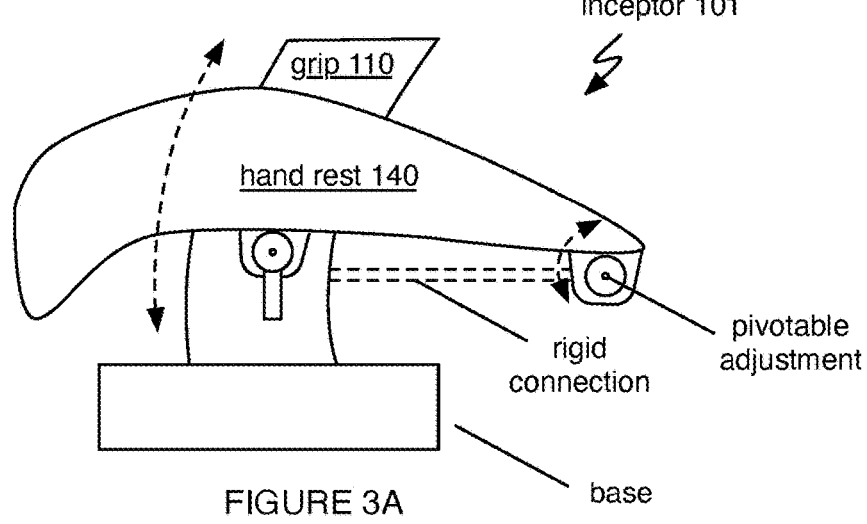
FIGURE 3A
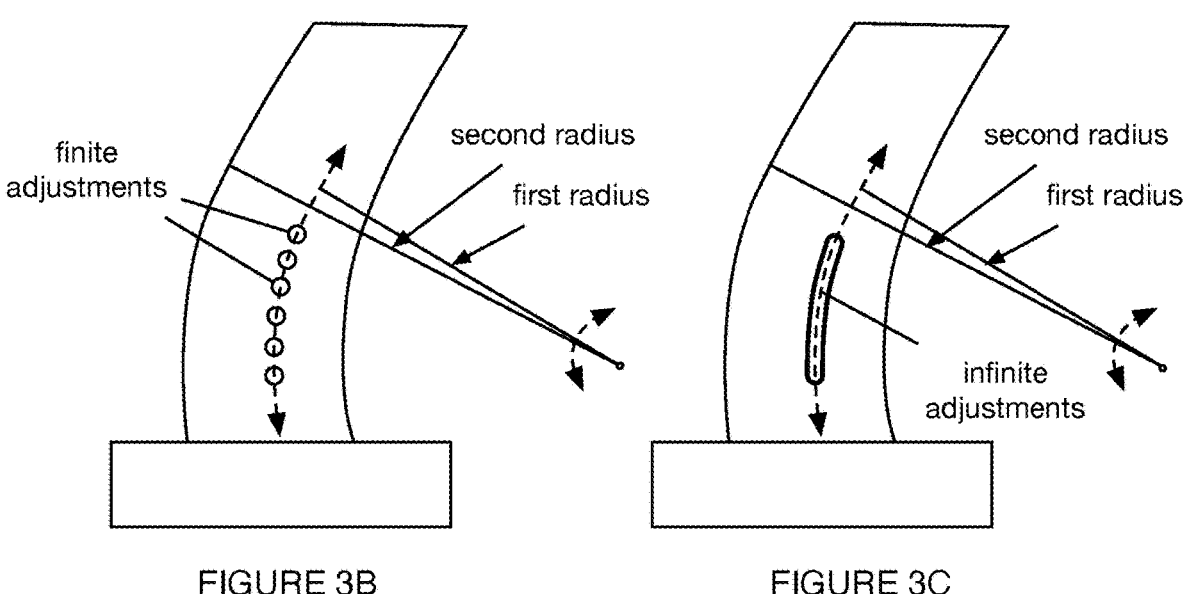
FIGURE 3B                              FIGURE 3C rotary effector hover configuration tilt wing forward configuration aircraft hover
arrangement aircraft forward
arrangement

S100 inceptor 101 inceptor 101 hand rest 140 pivotable
adjustment inceptor
grip 110 hand rest 140

100

100

Thumb
Wheel

130

130

130

112

114

140

130

Embedded
Sensors
for Primary
Axes
120

110

Embedded
Sensors
for Primary
Axes
120

110

110

110

100

110

Grip Edges

110

110

AIRCRAFT CONTROL SYSTEM AND METHOD

CROSS-REFERENCE TO RELATED APPLICATIONS

This application is a continuation of U.S. patent application Ser. No. 18/304,167, filed 20 Apr. 2023, which is a continuation of U.S. patent application Ser. No. 17/340,476 filed on 7 Jun. 2021, now issued as U.S. Pat. No. 11,673,649, which claims the benefit of U.S. Provisional Application No. 63/035,416 filed on 5 Jun. 2020, the disclosures of which are incorporated herein in their entireties by this reference as if explicitly set forth.

This application is related to U.S. application Ser. No. 16/409,653, filed 10 May 2019, and U.S. application Ser. No. 16/708,367, filed 9 Dec. 2019, each of which is incorporated in its entirety by this reference.

TECHNICAL FIELD

This invention relates generally to the aviation field, and more specifically to a new and useful control system and method in the aviation field.

BRIEF DESCRIPTION OF THE FIGURES

FIG. 3A to FIG. 3C are diagrammatic representations of a variant of a hand rest, a variant of a hand rest with a finite number of adjustments, and a variant of a hand rest with infinite adjustments, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
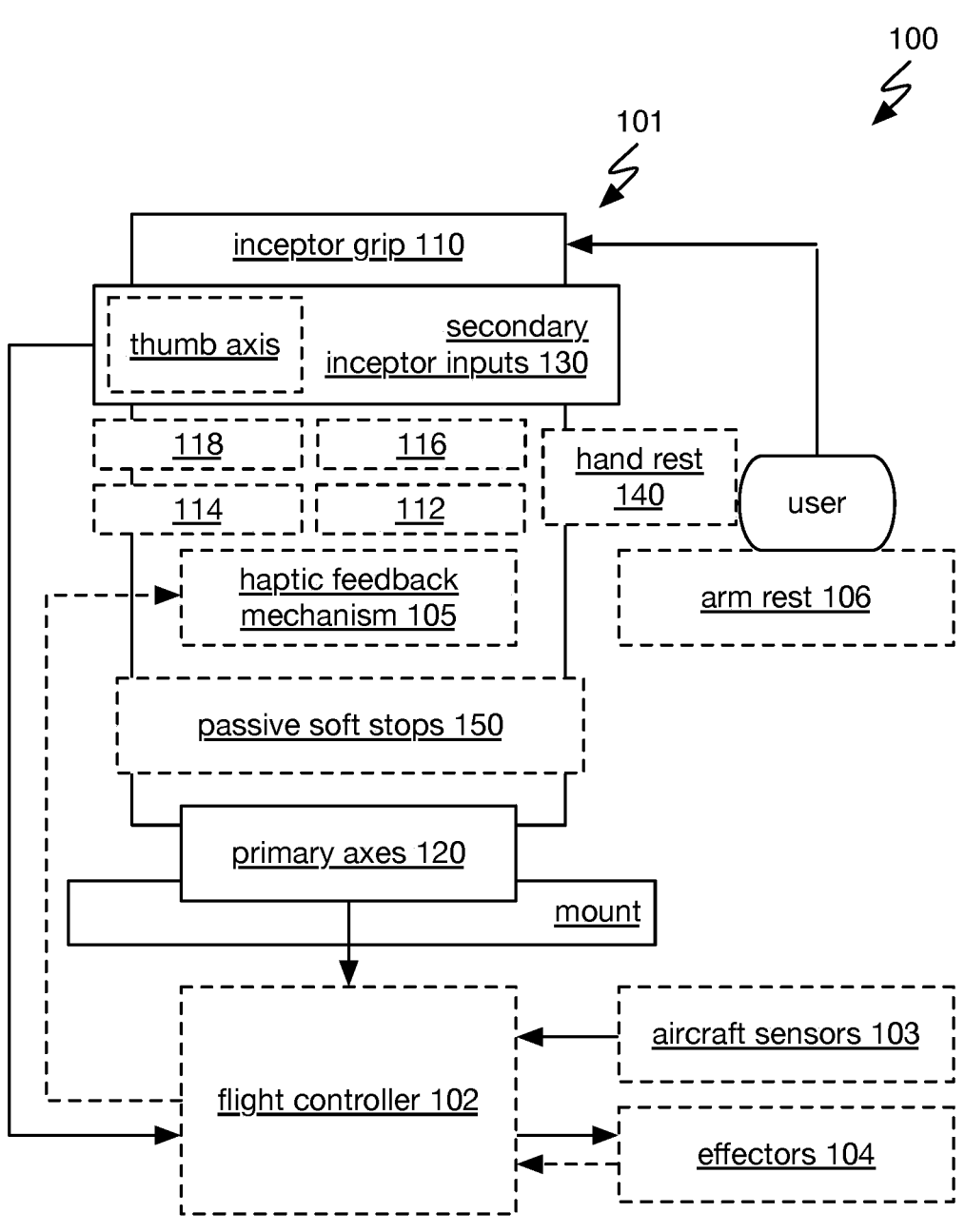
FIG. 1 is a schematic representation of a variant of the system 100.

As shown in FIG. 1, the aircraft control system 100 includes at least one inceptor 101. The aircraft control system can optionally include a flight controller 102, aircraft sensors 103, effectors 104, and a haptic feedback mechanism 105. The inceptor 101 can include: inceptor grip 110, a set of primary inceptor axes 120, and a set of secondary inceptor inputs 130. The inceptor can optionally include a hand rest 140, passive soft stops 150, and/or any other additional elements. However, the aircraft control system 100 can additionally or alternatively include any other suitable components.

Figures 8, 9, 10:
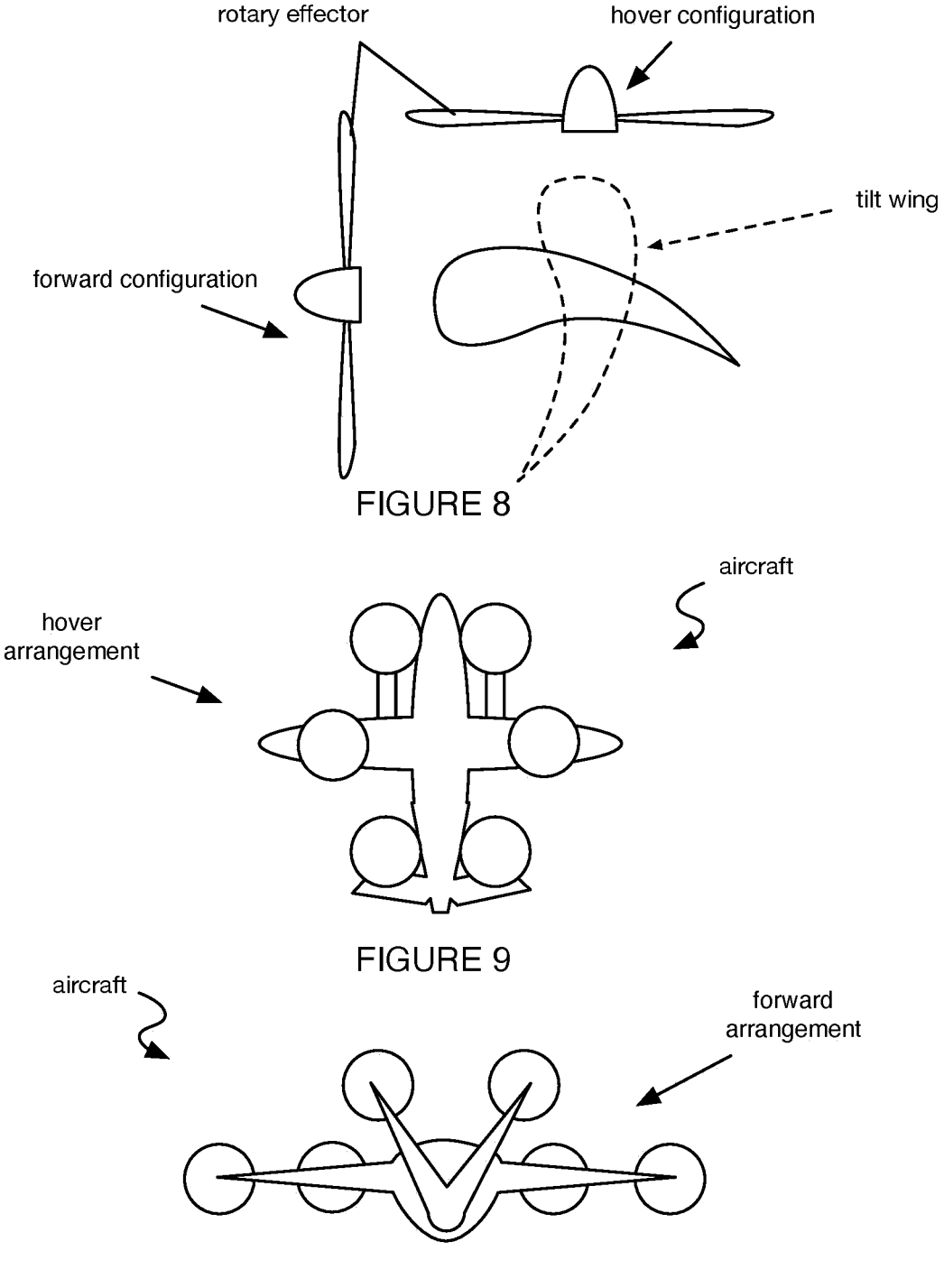
FIG. 8 depicts an example of forward and hover configurations of a rotor relative to a wing.
FIG. 9 depicts an example of an aircraft in the hover arrangement.
FIG. 10 depicts an example of an aircraft in the forward arrangement.
Figure 11A:
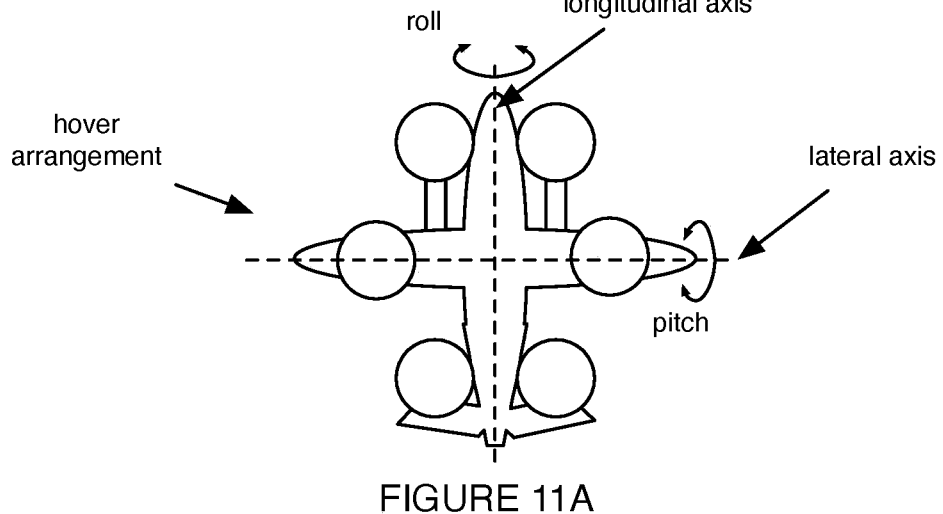
FIG. 11A and FIG. 11B are a top view and rear view of an aircraft illustrating aircraft axes in the hover arrangement and forward arrangement, respectively.
Figure 11B:
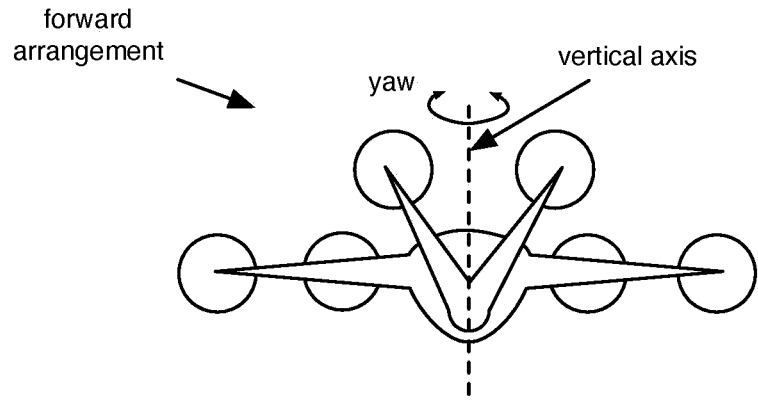

The aircraft control system 100 and/or method is preferably implemented in conjunction with an aircraft (e.g., the system can include an aircraft, the system can be optimized and/or tailored to a specific aircraft, the system can be interchangeable between multiple types of aircraft, etc.). The rotorcraft is preferably a tiltrotor aircraft with a plurality of aircraft propulsion systems (e.g., rotor assemblies, rotor systems, etc.), operable between a forward arrangement (examples are shown in FIG. 10 and FIG. 11B) and a hover arrangement (some examples are shown in FIG. 8, FIG. 9, and FIG. 11A). However, the rotorcraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), and/or any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

The aircraft can have any suitable mass (e.g., unloaded mass, loaded mass, maximum takeoff mass, etc.) with any appropriate mass distribution (or weight distribution). The aircraft mass can be: less than 1 kg, 1 kg, 5 kg, 10 kg, 50 kg, 100 kg, 500 kg, 1000 kg, 1250 kg, 1500 kg, 1750 kg, 2000 kg, 2250 kg, 2500 kg, 2750 kg, 3000 kg, 5000 kg, 1000 kg, 20000 kg, less than 1500 kg, 1500-2000 kg, 2000-3000 kg, 3000-5000 kg, 5000-10000 kg, greater than 10000 kg, any suitable range bounded by the aforementioned values, and/or any other appropriate mass. The aircraft is preferably a passenger carrier, configured to transport 1, 2, 3, 5, 7, 10, greater than 10, and/or any suitable number of passengers, however the aircraft can alternately be an unmanned aircraft, a teleoperated passenger aircraft, a remotely piloted aircraft, and/or any other suitable aircraft.

In a specific example, portions of the aircraft control system 100 are integrated into the electric tiltrotor aircraft described in U.S. application Ser. No. 16/409,653, filed 10 May 2019, which is incorporated in its entirety by this reference. However, any other suitable aircraft can be used.

In a specific example of the system, portions of the system are integrated into an electric tiltrotor aircraft including a plurality of tiltable rotor assemblies (e.g., six tiltable rotor assemblies, an example of a tiltable rotor is shown in FIG. 8). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

The term "axis" as referenced herein preferably refers to a degree of freedom in which a body (e.g., inceptor grip, roller wheel, etc.) is transformable (e.g., rotational degree of freedom, linear degree of freedom, etc.). Such axes can be used to define a physical coordinate frame of the body, which can be associated with and/or constrained by various joints (e.g., revolute joints, spherical joint, bearings, etc.), linkages, hard stops, and/or other mechanisms. Measurements taken by input sensors aligned with said degree of freedom of the body can be used for various inputs. Accordingly, the term "input axis" can likewise interchangeably refer to a sensor coordinate frame (or the range of measurements thereon) and/or the corresponding coordinate axis of the body. However, the term axis and/or input axis can have any other suitable meaning.

An "active" inceptor as referenced herein is an inceptor which can modify the force-feel characteristics in a closed loop response. Force-feel characteristics can include: inertia, force/displacement gradient, damping, breakout force, stick travel, and detent shape configuration parameters in the inceptor control laws. A "passive" inceptor as referenced herein is an inceptor which does not use electrical energy and/or power sources onboard the vehicle to adjust (e.g., by the flight computer) the force-feel characteristics of the inceptor depending on the status of the aircraft. Both active and passive inceptors as referenced herein can include haptic feedback mechanisms, which can, in some variants, be electrically controlled depending on the status of the aircraft.

The term "rotor" as utilized herein, in relation to portions of the system 100, method S100, or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The term "substantially" as utilized herein can mean: exactly, approximately, within a predetermined threshold (e.g., within 1%, within 5%, within 10%, etc.), predetermined tolerance, and/or have any other suitable meaning.

2. Benefits

Variations of the technology can afford several benefits and/or advantages.

First, variations of the technology can minimize the number of input mechanisms managed by the user during flight, while maintaining a suitable level of user cognitive workload. In variants, aircraft will lack direct human controls for: power (throttle, propeller control), aircraft configuration (tilt, flaps, landing gear), aircraft control (trim, rudder pedals, brake pedals), and/or other control parameters, but can additionally or alternatively include direct human controls for any of the aforementioned control parameters. For example, the system can include a single inceptor that can control the aircraft across various flight regimes without altering the input axes in which the user inputs commands (e.g., via dynamic remapping between input axes and effector states based on flight regime). A single inceptor can also advantageously reduce mass, system complexity, compactness, and/or aid in ingress and egress from the aircraft. In some variants, the inceptor(s) can self-center to a neutral position associated with stable aircraft flight, allowing the user to incidentally remove a hand(s) from the inceptor in all flight modes (conditions permitting) without destabilizing the aircraft.

Second, variations of the technology can facilitate single-user operation in complex environments and situations. The cognitive workload of the unified command system and method can be tailored to specific tasks: for example, the workload can be adapted to single-user operation of a VTOL-capable aircraft in urban environments (e.g., without the nominal workload substantially exceeding nor falling substantially short of such tasks, to prevent overwork and boredom/disengagement). The cognitive workload can also be oriented toward aeronautical decision making (e.g., which aircraft actions should be commanded) instead of technical decision making (e.g., which aircraft effectors should be in which effector states).

Third, variations of the technology can facilitate operation of an inceptor without the use of the thumb and/or fingers, leaving them free for additional inputs (an example is shown in FIG. 20, FIG. 22A to FIG. 22D, FIG. 28A to FIG. 28B, and FIG. 29A to FIG. 29B). In variants, multi-axis input requirements can be controlled by free, independent articulation of unique muscle groups (i.e. the one muscle group is not required to control multiple independent axes). In a specific example, articulation of the thumb fully controls vertical rate, and is not required for manipulation of the X-axis, Y-axis, and/or Z-axis of the inceptor. In a second specific example, articulation of the thumb fully controls airspeed rate (e.g., during forward flight), and is not required for manipulation of the X-axis, Y-axis, and/or Z-axis of the inceptor. In a third specific example, articulation of the thumb fully controls longitudinal rate and acceleration (e.g., during hover), and is not required for manipulation of the X-axis, Y-axis, and/or Z-axis of the inceptor. In a fourth specific example, articulation of the thumb fully controls thrust and/or wheel motors (e.g., during ground operation), and is not required for manipulation of the X-axis, Y-axis, and/or Z-axis of the inceptor.

Fourth, variations of the technology can minimize the number of feedback systems managed by the user and/or streamline the management feedback systems, which can reduce the cognitive workload of the pilot. Additionally, feedback systems can prioritize different types of feedback to reduce alarm fatigue and/or low cognitive attentiveness which can result from constant or repetitive exposure to low severity alerts. In particular, haptic feedback requires the least cognitive attentiveness because it is directly associated with the task of manipulation of the input mechanism(s). In variants, haptic feedback can be used to communicate information beyond force feedback on primary axes of the inceptor, thereby reducing the required number of feedback systems and/or achieving an appropriate level of feedback redundancy.

Fifth, variations of the technology utilizing a single inceptor can reduce aircraft mass and/or complexity. Variants of this technology can further reduce weight and complexity by utilizing passive force feedback mechanisms one or more inceptor axes (e.g., with a mustache cam), so that a motor is not required to generate force feedback on each axis—which can further reduce system complexity and mass.

Sixth, variations of the technology can increase the number of inputs available for a single control axis. In variants, actuation in a single direction along a single axis can map to one or more inputs to confer additional control. In a specific variant, pushing through a soft stop can provide an additional pilot input command. In a specific example, pushing through a soft stop can provide a user confirmation to exit an augmented flight mode.

3. System

As shown in FIG. 1, the aircraft control system 100 includes at least one inceptor 101. The aircraft control system can optionally include a flight controller 102, aircraft sensors 103, effectors 104, and a haptic feedback mechanism 105. The inceptor 101 can include: inceptor grip 110, a set of primary inceptor axes 120, and a set of secondary inceptor inputs 130. The inceptor can optionally include a hand rest 140, passive soft stops 150, and/or any other additional elements. However, the aircraft control system 100 can additionally or alternatively include any other suitable components.

The inceptor 101 functions to receive command input (input command) from a user of the aircraft in the form of physical departures of the inceptor position from a neutral position. The inceptor can be coupled to a flight processor in an indirect, "fly-by-wire" manner, such that no primary control of effectors is available to the user (e.g., all direct effector control is generated by the flight processor in response to received command input from the input mechanism). A fly-by-wire coupling between the inceptor and the flight processor (e.g., and the effectors by way of the flight processor) can enable an inceptor having 2 or more independent axes to be used without complex mechanical flight control linkages between the inceptor and aircraft effectors (e.g., which can limit the number of aircraft motion axes and associated effectors each inceptor can practically control). Alternatively, the inceptor can include direct connections (e.g., primary control) to one or more effectors, and/or any suitable combination of direct and indirect connections.

Figure 6:
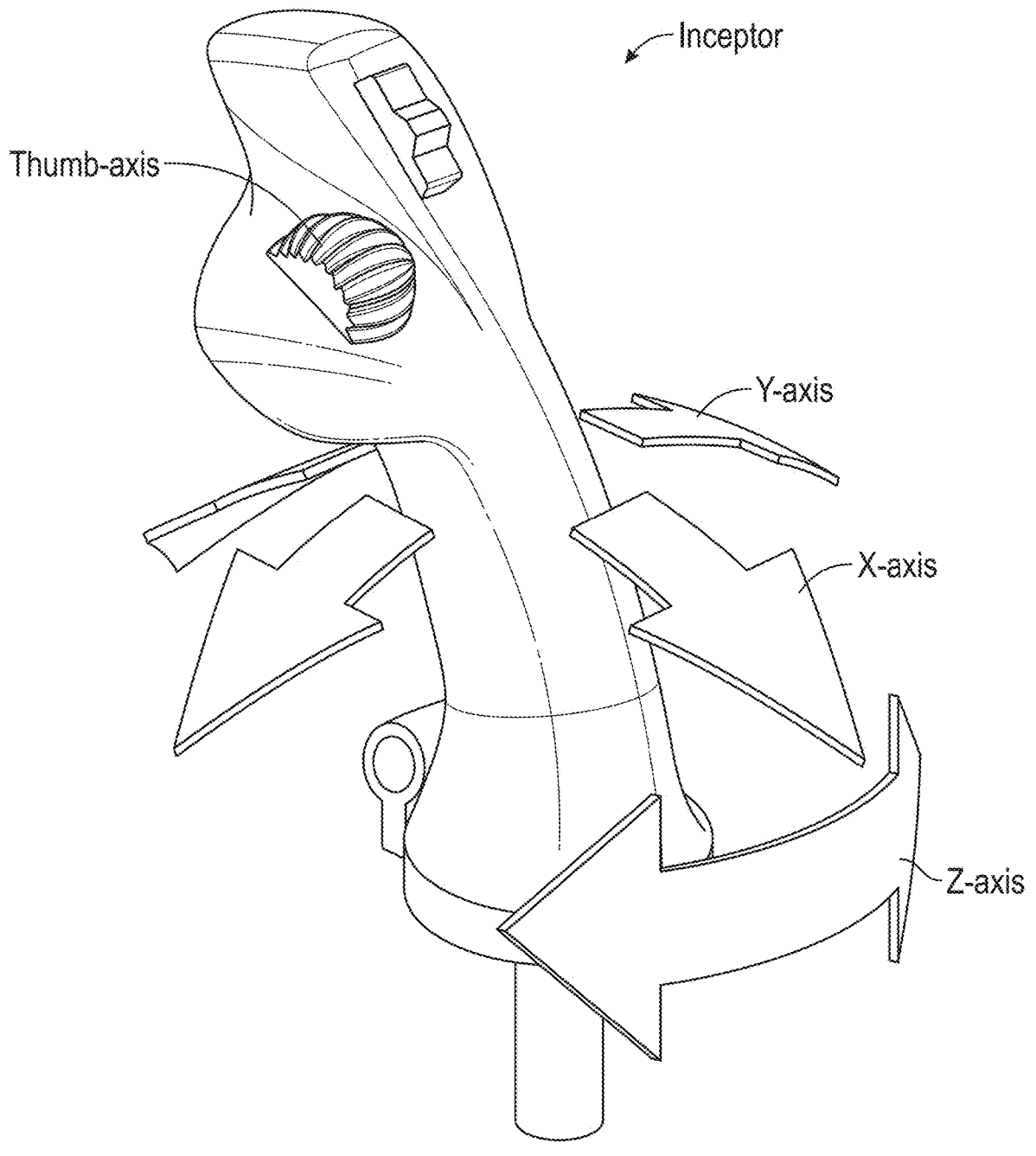
FIG. 6 depicts an example inceptor and associated command axes.

The physical departures of the inceptor can be decomposed in space between the X-axis, Y-axis, Z-axis (a.k.a. twist axis), and A-axis motions as shown by example in FIG. 6; however, the physical departures from a neutral position can be otherwise suitably decomposed. For each axis, the stick deflection can be measured with absolute or relative position (e.g., displacement, angular position, etc.). The inceptor (e.g., axis of inceptor, base of the inceptor, and/or linkages connected to the inceptor) can include one or more: position transducer, capacitive displacement sensor, eddy-current sensor, hall effect sensor, inductive sensor, laser doppler vibrometer (optical), linear variable differential transformer (LVDT), photodiode array, force sensors, strain gauges, piezo-electric transducer (piezo-electric), position encoders (absolute encoder, incremental encoder, linear encoder, rotary encoder, etc.), potentiometer, proximity sensor (optical), string potentiometer (a.k.a. string pot, string encoder, cable position transducer), ultrasonic sensor, and/or any other suitable devices which can be configured to measure departures of the inceptor. Axes of the inceptor can have the same sensor type or different sensor types. The inceptor can include redundant sensors (e.g., or the same type or different types, force sensors and position sensors, etc.) for each axis or a subset therein. In variants, sensors which can infer inceptor position or pilot commands via force (e.g., strain gauge, force sensor, load cell, etc.) can mitigate a mechanical jam—where a position sensor may be less reliable. However, force sensing can alternatively be the primary sensing modality in one or more axes (e.g., with position sensing as a validating measurement, without position sensing, etc.) and/or may otherwise not be relied upon.

Figure 15A:
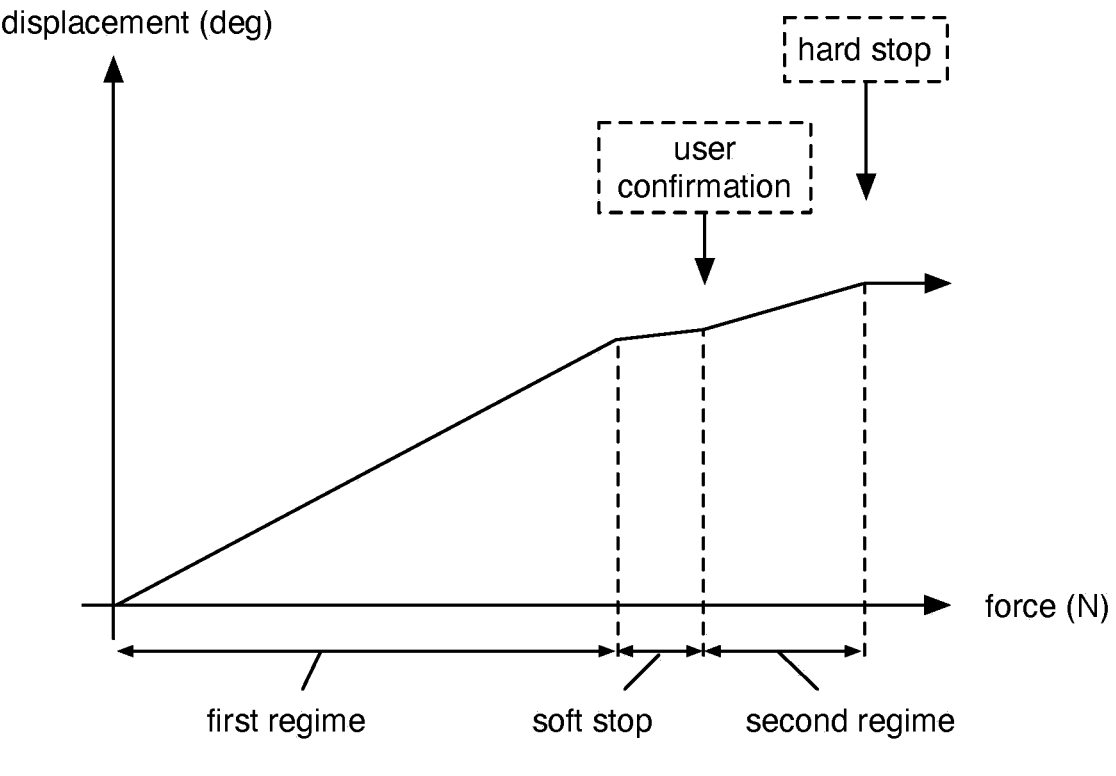
FIG. 15A is a force versus displacement graph for an axis of an inceptor which includes a soft stop in a variant of the system.

One or more axes of the inceptor can include force feedback mechanisms and/or soft stops—where the relative force required to displace the inceptor (e.g., slope of force vs displacement curve) increases over a bounded interior range of input forces and/or displacements (an example of a force versus displacement curve for an inceptor axis including a soft stop is shown in FIG. 15A). Force feedback mechanism can be configured to provide: constant force versus deflection, variable force versus deflection, no force (substantially zero, less than 1 N, etc.) versus deflection, no deflection allowed, change force versus deflection on opposing sides of a soft stop, and/or otherwise operate across any range of deflections of the inceptor. Soft stop mechanisms can be passive (implemented on a passive inceptor or passive inceptor axis) or active (implemented on an active inceptor).

Soft stops can be located on one side (e.g., positive or negative) or both sides (e.g., symmetrically, asymmetrically) about a neutral position of the axis. Soft stops can be static, adjustable in hardware, adjustable in software (e.g., mapping sensitivity/envelope is adjustable), defined based on the flight envelope, and/or otherwise configured. Preferably, the inceptor includes at least one soft stop on opposing sides of an axis, but can include no soft stops per side of an axis, multiple soft stops per side of an axis, a different number of soft stops in the positive and negative directions (e.g., for an axis mapping to aircraft pitch in forward) of an axis and/or other suitable number of soft stops. Soft stops can, in variants, serve as a user input type and/or confirmation (e.g., to exit an augmented flight mode, to exceed a safety limit, to engage an augmented flight mode, etc.).

In a first variant, soft stops are configured on an active axis of the inceptor, which can be electro-mechanically actuated by a motor or other powered mechanism (e.g., hydraulic, pneumatic, etc.) to dynamically change the force required to displace the inceptor along the axis.

Figure 23:
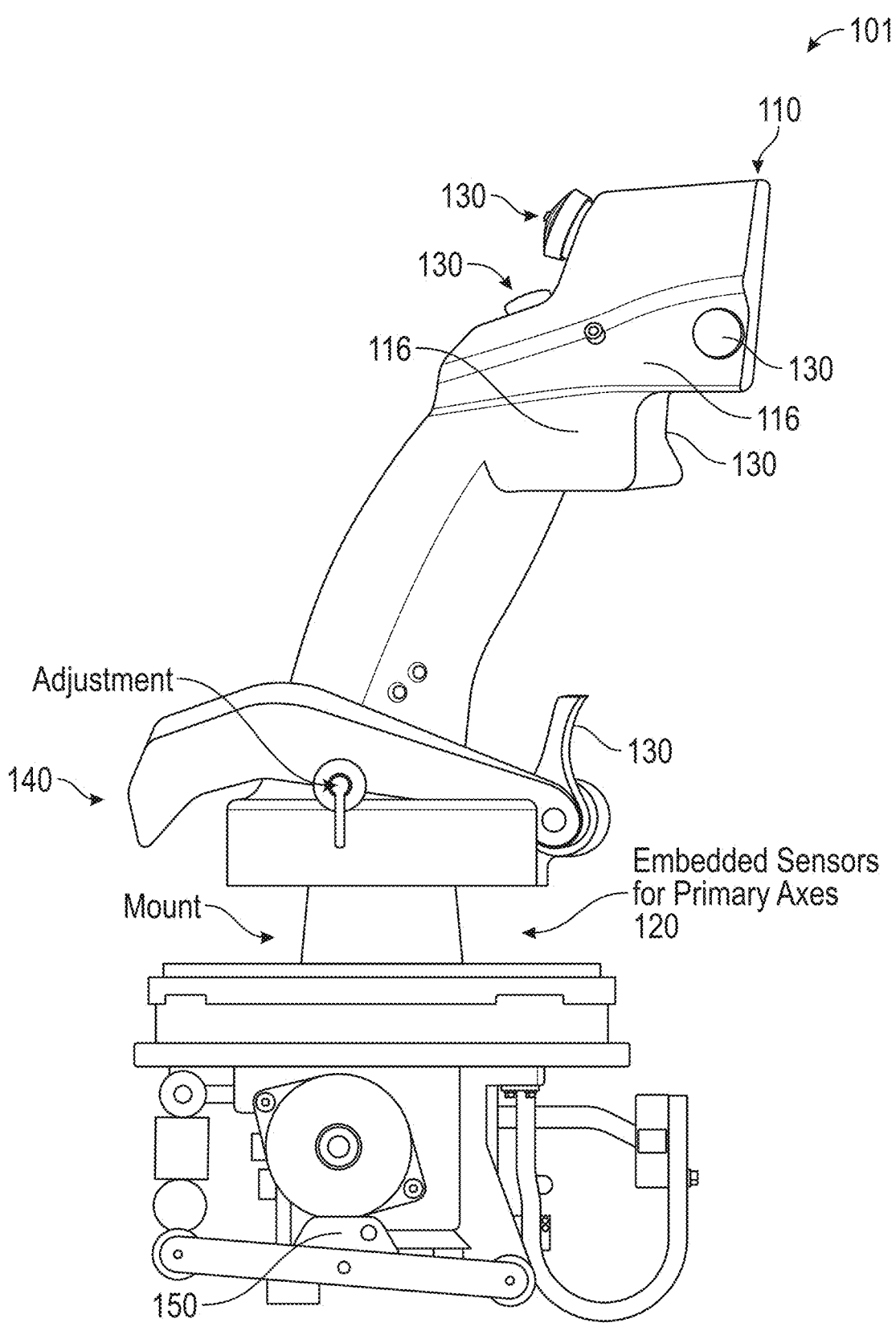
FIG. 23 is a side view of a variant of the system 100.

In a second variant, soft stop mechanisms rely on elastic spring/damping effects to increase the slope of the force vs displacement curve over a predetermined range of input forces and/or displacements. Passive soft stops can include cam and/or mechanical linkages connected to a spring such as a: mechanical spring, coil spring, extension spring, torsion spring, constant force spring, Belleville spring, garter spring, flat spring, gas spring, air spring, and/or any other suitable spring. In a specific example, a soft stop mechanism can include a moustache-shaped cam (an example is shown in FIG. 23). In a second specific example, soft stops can use preloaded springs (e.g., pre-tensioned, pre-compressed, etc.) with contact pins only engaged for a predetermined portion of displacements about the respective axis. Such instances can provide a force 'step', requiring the entire preload to be countered by a user before the inceptor displaces further along the axis (an example is shown in FIG. 26A to FIG. 26E). Preloaded spring mechanisms can advantageously provide 'crisp' transitions between regimes along the force vs displacement curve.

In a third variant, soft stops can be used in conjunction with a deadband (e.g., spanning a neutral position of the inceptor) and/or define the boundaries of a deadband. Deadband soft stops can provide any suitable breakout torque (and/or force) thresholds, such as: 0.5 in-lbs., 1, in-lb., 2 in-lbs., 3 in-lbs., 5 in-lbs., 6 in-lbs., 10 in-lbs., and/or any other suitable threshold in any inceptor axis. Deadband soft stops can be symmetric about the neutral position or asymmetric. In a specific example, wrist flexion can be significantly 'easier' than wrist extension for users utilizing various grip arrangements. In such cases, it can be advantageous to utilize different breakout thresholds in opposing directions along the axis based on the relative ease of rotation. Alternatively, the structure of the inceptor grip can substantially balance the relative ease of rotation in both directions about the axis. In such cases, symmetric breakout thresholds can reduce cross-axis contamination and/or eliminate cross-axis contamination bias in a particular axis (e.g., as a result of asymmetric breakout thresholds).

However, any other suitable soft stop can be used.

Figure 2A:
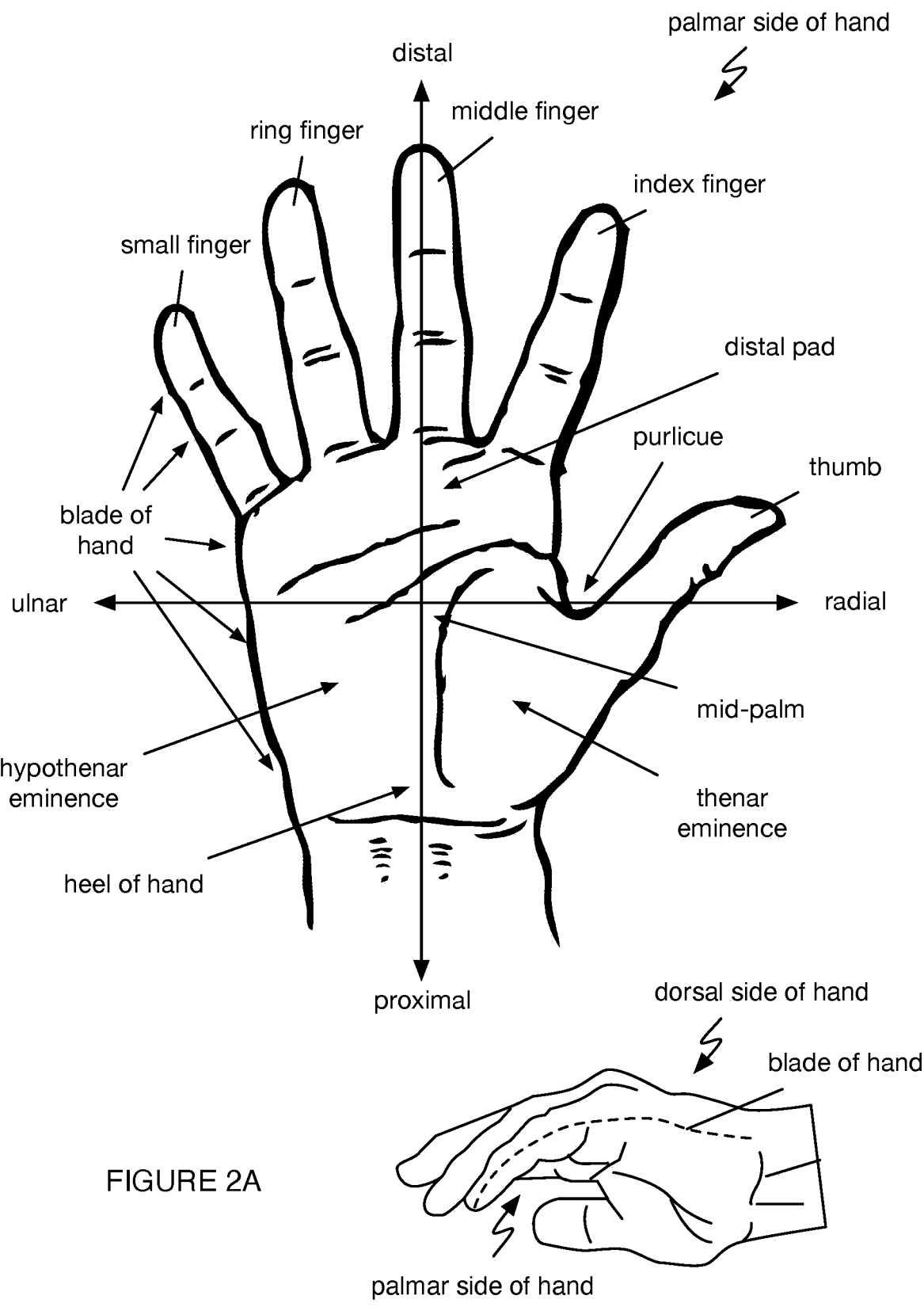
FIG. 2A is a diagrammatic representation of a hand viewed from the palmar side.
Figures 16, 17:
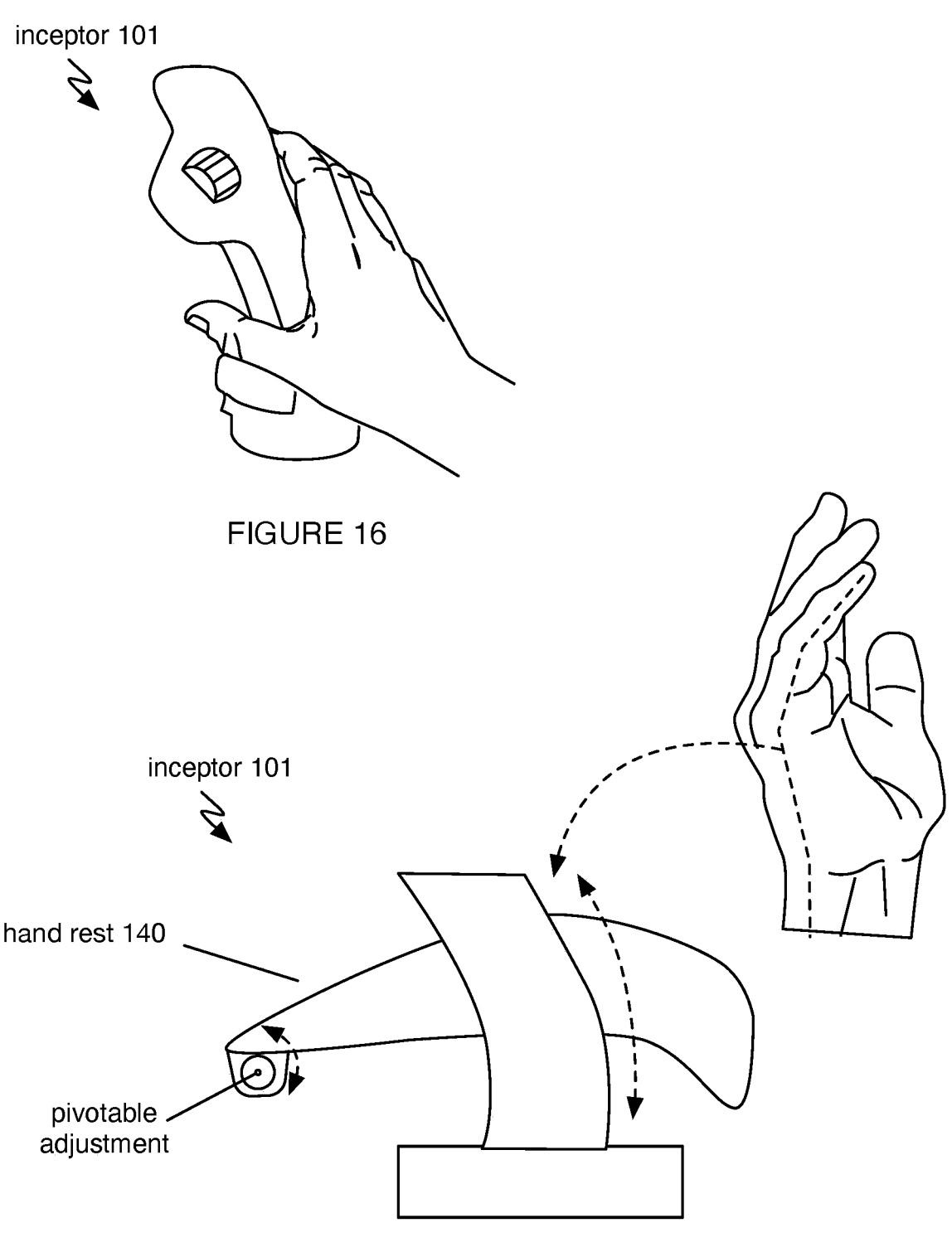
FIG. 16 is an example of a conventional inceptor without a hand rest.
FIG. 17 is a variant of an inceptor with an adjustable hand rest.

The inceptor can include a hand rest (e.g., hand blade rest, ulnar border rest, palm rest), which functions to improve the ergonomics of the inceptor. The hand rest can additionally or alternately function to allow manipulation of one or more control axes with the thumb, index finger, and/or middle finger free. The hand rest can engage and/or support the: blade of hand (an example is shown in FIG. 2A), thenar eminence, hypothenar eminence, heel of hand, ulnar border of hand, base of the proximal phalanx (e.g., base of the small finger), small finger, wrist, ulnar border of forearm, and/or any other suitable user body part. Alternately, there can be no hand rest (an example is shown in FIG. 16).

Figures 4, 5:
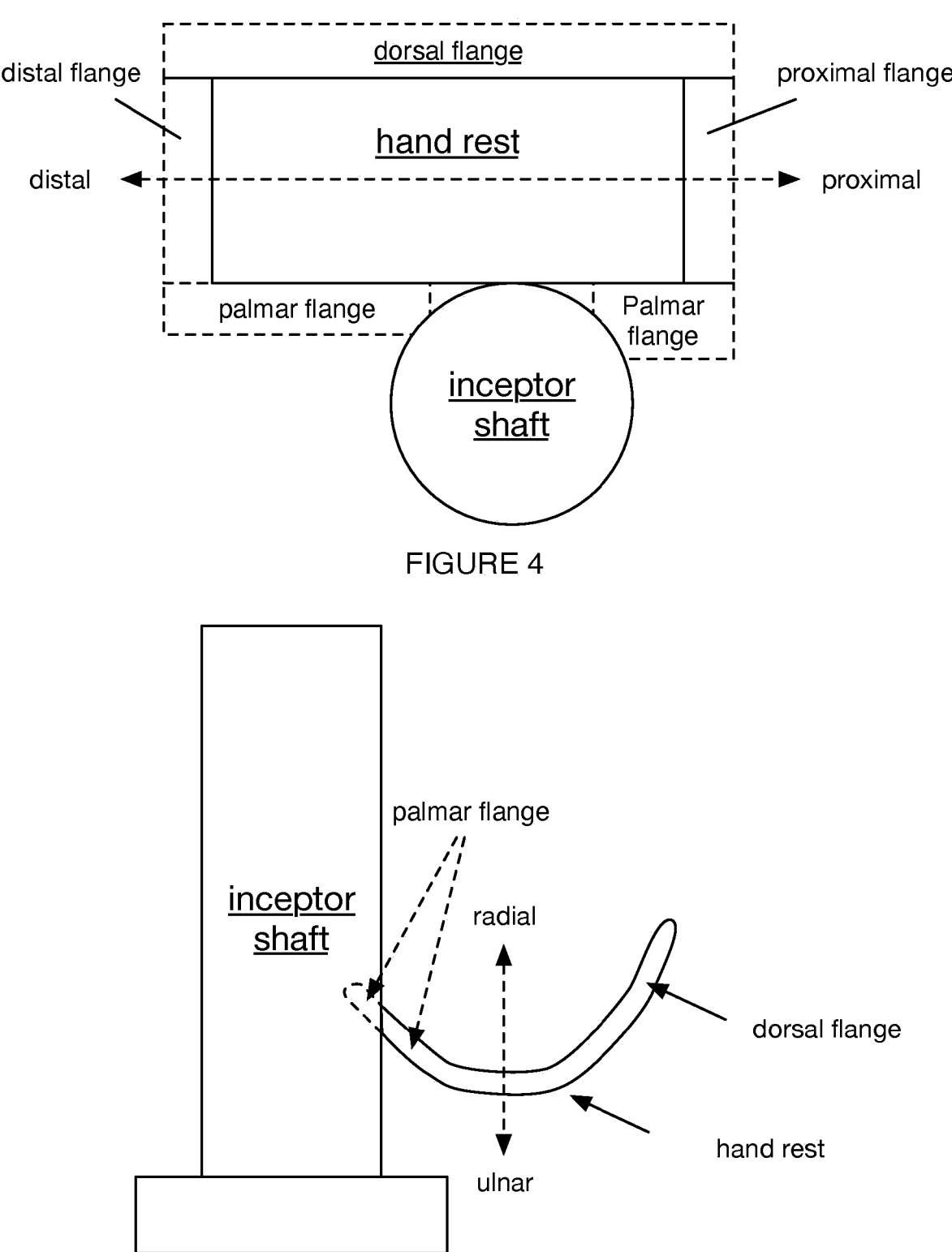
FIG. 4 is a top view representation of a variant including a hand rest.
FIG. 5 is a side view representation of a variant including a hand rest.

The hand rest can include any suitable flanges which function to contact and/or engage body parts to transmit forces between the user and the inceptor. The hand rest can include a dorsal flange (an example is shown in FIG. 4), palmar flange (an example is shown in FIG. 5), distal flange, proximal flange, and/or any other suitable flanges.

Figure 2B:
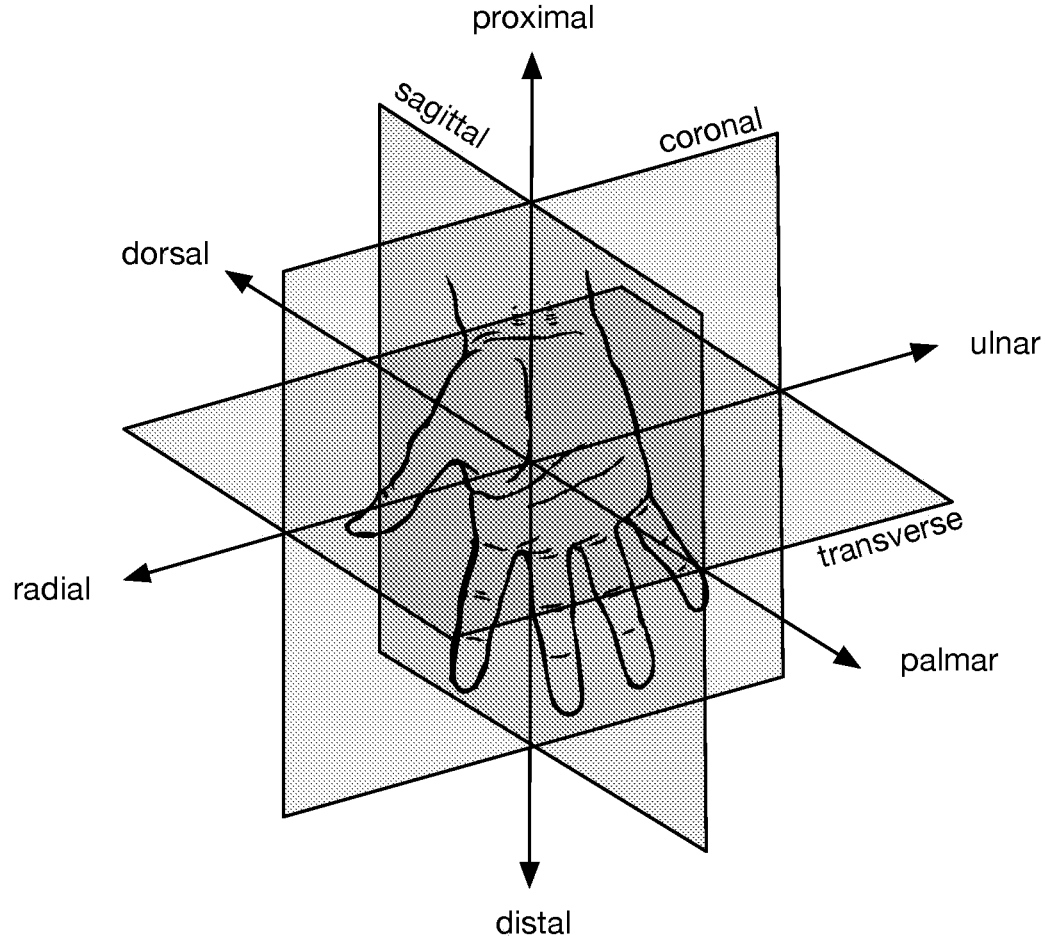
FIG. 2B is an isometric representation of a hand illustrating reference planes and directions.

The dorsal flange can be arranged on the opposite side of the hand as the inceptor grip (e.g., distal, dorsal, peripheral, etc.; examples of hand planes are illustrated in FIG. 2B). The dorsal flange is preferably connected to the grip of the inceptor by the palmar flange, but can alternately be supported by bracing extending from the grip or base of the inceptor. The dorsal flange preferably extends across a full thickness of the grip (i.e. the length of the dorsal flange parallel the grip's x-axis is greater than or equal to the thickness of the inceptor grip at the base) and can extend vertically (e.g., substantially parallel the grip's z-axis), however the dorsal flange can extend across a portion of the grip, be angled relative to a grip plane or axis, and/or be otherwise arranged. Preferably, the length of the dorsal flange is 5 inches (e.g., average palm length) or 8 inches (e.g., average hand length), but can be less than the average palm length, less than the average hand length, greater than the average palm length, greater than the average hand length, variable length (e.g., adjustable length), the same length as the hand rest, shorter than the hand rest, longer than the hand rest, rise part way along the grip, be configured to engage a dorsal portion of the hand (e.g., dorsal portion of small finger, dorsal portion of hypothenar eminence) and/or otherwise suitably implemented. The dorsal flange is preferably configured to be engaged by an extension of the wrist, hyperextension of one or more fingers, supination of the forearm, horizontal rotation (or external rotation) of the shoulder, and/or other suitable motion.

Figure 18:
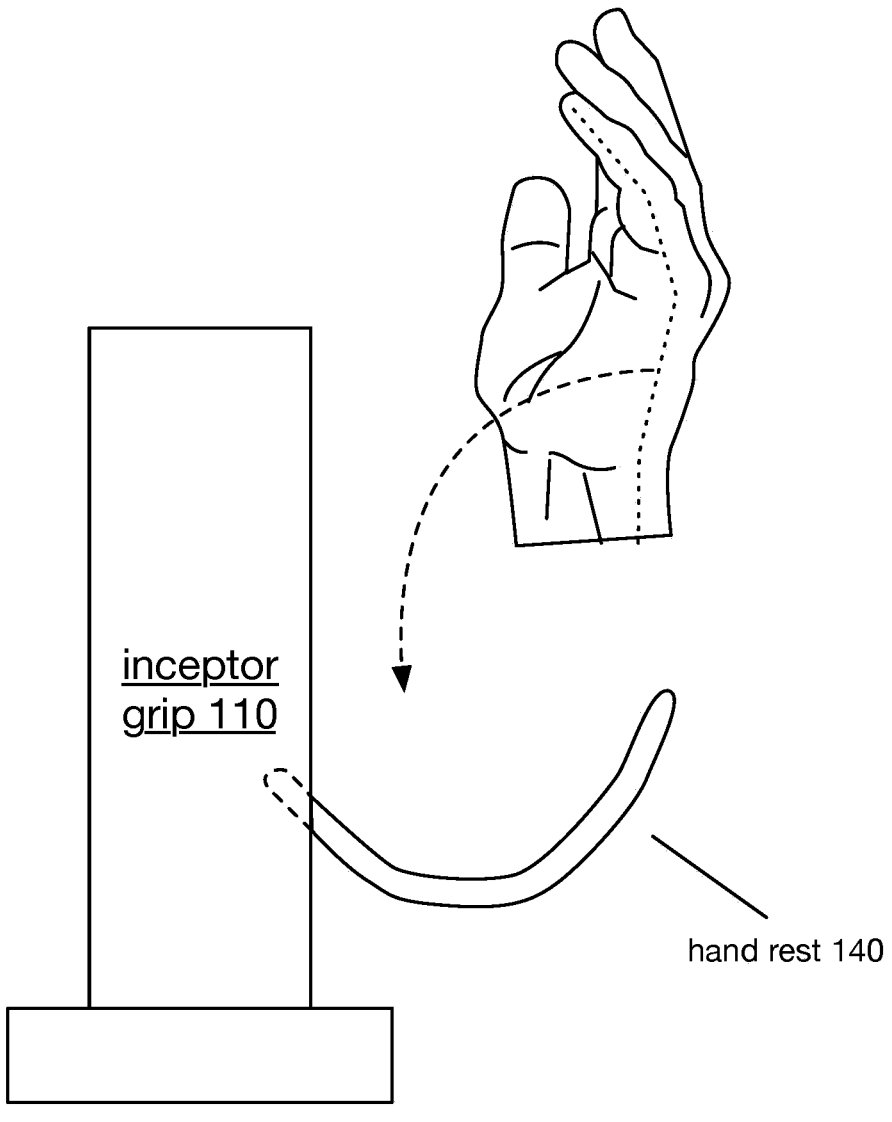
FIG. 18 is a schematic representation of an example hand placement of relative to the inceptor grip.

The hand rest can optionally include a palmar flange which can be mounted to the grip or base of the inceptor. The mounting can be static or movable (e.g., for adjustable hand rests), can be rigid or flexible, and/or can be otherwise suitably implemented. The palmar flange is preferably adjacent to the inceptor grip, and can be tangentially arranged relative to the thickness, extend radially from the thickness of the inceptor (e.g., in the same direction as the fingers, in the same direction as the palm), be angled relative to the inceptor grip: along a midplane, away from the palm, toward the palm, angled in the direction of wrist supination, angled in the direction of wrist pronation, parallel to the palm in the direction of the fingers, and/or otherwise suitably implemented. The palmar flange can be substantially the same length as the dorsal flange (or within 5%, 10%, 20%, etc.), however the palmar flange can have a different length than the dorsal flange, extend only toward the user from the inceptor grip (e.g., substantially parallel the grip's negative x-axis or at an angle thereto), extend only away from the user relative to the inceptor grip (e.g., substantially parallel the grip's positive x-axis or at an angle thereto), extend both towards and away from the user relative to the inceptor grip, be mounted to a palmar side of the inceptor grip, and/or be otherwise configured. Preferably, the length of the palmar flange and/or palmar engagement of the inceptor cooperatively defined by the inceptor grip and palmar flange is 5 inches (e.g., average palm length) or 8 inches (e.g., average hand length), but can be less than the average palm length, less than the average hand length, greater than the average palm length, greater than the average hand length, variable length (e.g., adjustable length, swappable length, customizable to a user), and/or have any other suitable length. The palmar flange can rise part way along the grip (an example is shown in FIG. 18), be configured to engage a palmar portion of the hand (e.g., palmar portion of small finger, palmar portion of hypothenar eminence) and/or be otherwise suitably implemented.

Figure 2C:
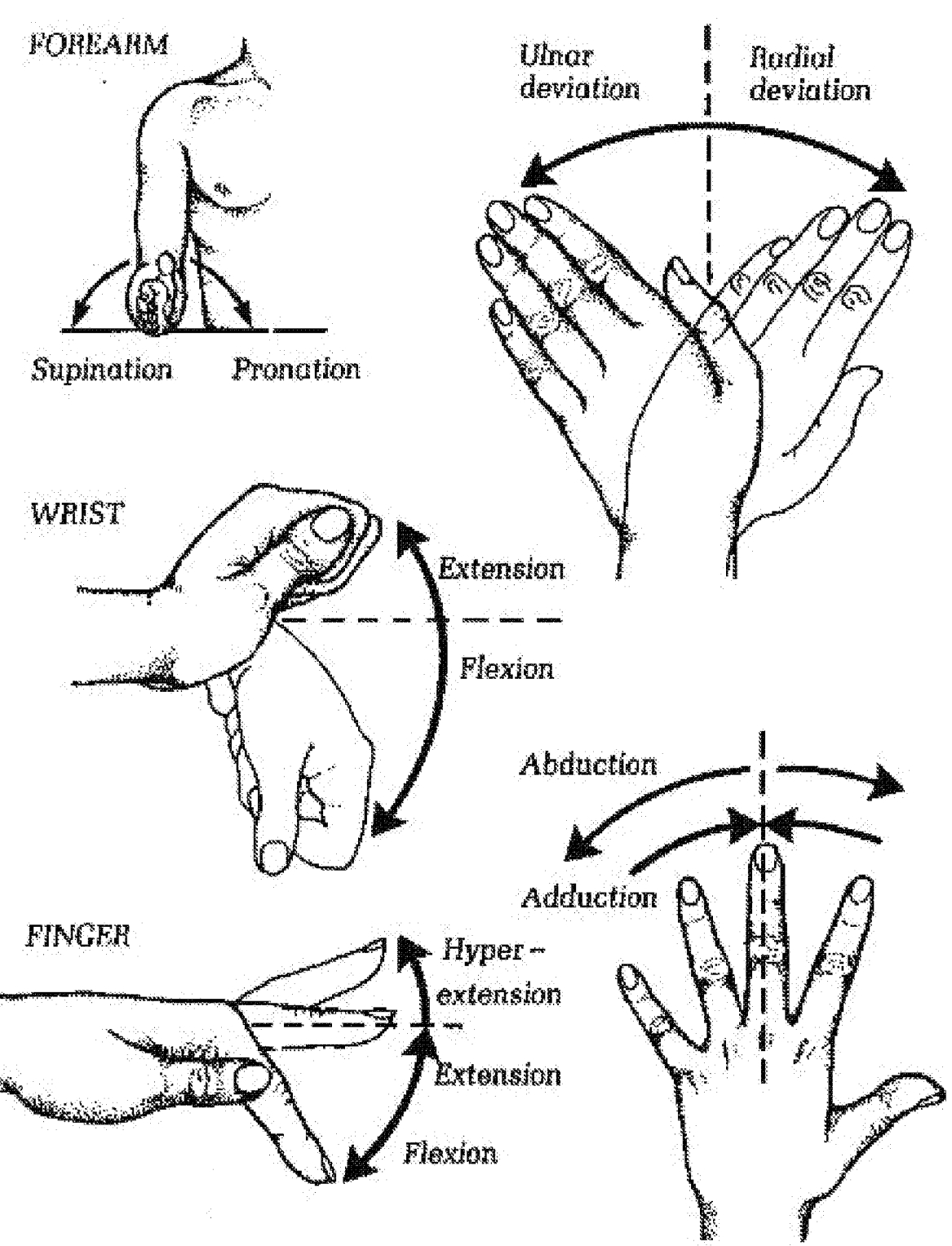
FIG. 2C is a diagrammatic representation of hand and forearm motions and associated terms.

The hand rest can optionally include a distal flange and/or proximal flange, which can function to increase the contact area of the inceptor against the user's hand and/or improve the ergonomics of the inceptor. The distal flange and/or proximal flange are preferably angled downward toward the base of the inceptor, but can be flat, angle upward, and/or otherwise suitably arranged. The proximal flange can define a steeper angle than the distal flange (e.g., relative to the inceptor), the proximal and distal flanges can have the same angle, or they can be otherwise suitably implemented. Preferably the proximal flange engages the hand blade and/or wrist during a radial deviation of the wrist, but can engage the hand blade and/or wrist at all times, during other user articulations, at various customizable angles of the hand rest, during ulnar deviations of the wrist (an example is shown in FIG. 2C), not contact the user, and/or the proximal flange can otherwise suitably contact the user. In an example, the contact area between the proximal flange and the user can increase during radial deviations of the wrist and/or the contact area between the proximal flange and the user can decrease during ulnar deviations of the wrist. The distal flange can engage the hand blade and/or small finger (e.g., ulnar border of the hand) during ulnar deviations of the wrist, but can engage the hand blade and/or small finger at all times, during other user articulations, at various customizable angles of the hand rest, during radial deviations of the wrist, not contact the user, and/or the distal flange can otherwise suitably contact the user. The distal flange can additionally or alternately mount the hand rest to the inceptor (e.g., inceptor grip) and/or serve as a pivot point for the hand rest (e.g., in variants with an adjustable hand rest, examples are shown in FIG. 3A to FIG. 3C).

However, the hand rest can include any other suitable set of flanges and/or otherwise suitably engage the hand.

In variants, the hand rest can be adjustable and/or configurable, which can improve ergonomics and/or user control authority. The hand rest can additionally allow for positive grip and access to secondary inceptor inputs (e.g., buttons and switches) across anthropomorphic ranges. In particular, this is important because hand dimensions vary largely across user populations. In a specific example, hand breadth can vary from 6.9 cm in a 5.sup.th percentile female to 8.3 cm in a 95.sup.th percentile male. As a result, the position the thumb and/or fingers (e.g., proximal to the top of the inceptor grip, within the thumb and/or finger grooves, etc.) and/or inceptor ergonomics can be improved with an adjustable or reconfigurable hand rest. The hand rest can include adjustability along longitudinal, lateral, and/or vertical inceptor directions—which can be the same or different from the X, Y, and/or Z axes of the inceptor. Adjustment mechanisms on the inceptor can adjust the dimensions and/or relative position (to the inceptor grip) of the hand rest (an example is shown in FIG. 17). Adjustment mechanisms can increase a neutral pitch, yaw, and/or roll angle of the hand rest relative to the inceptor grip or relative to the base of the inceptor, increase a curvature of the hand rest, decrease a concavity of the hand rest, change a camber of the hand rest, change a groove width (e.g., between the palmar and dorsal flanges) of the hand rest, change a length of the hand rest, slide the hand rest in a palmar direction (e.g., closer to the grip) or in a dorsal direction (e.g., away from the grip), tilt the hand rest toward/away from the grip, pivot the hand rest about an axis (e.g., fixed relative to the inceptor grip). Adjustment mechanisms are preferably configured by manual adjustment, but can alternately be automatic, electrically actuated (e.g., acting as a portion of the feedback mechanism), statically stable in multiple positions, and/or otherwise configurable. In a first variant, the hand rest is pivotally mounted to the inceptor (e.g., inceptor grip) about a pivot axis. In a first example of the first variant, the pivot axis is located at the center point of inceptor curvature (e.g., exactly center point, within 10% curvature radius, within 20% curvature radius, within 50% curvature radius). An example is shown in FIG. 3A to FIG. 3C. In a second variant the palmar flange and/or bottom of the hand rest is slidable relative to the inceptor grip.

Adjustment mechanisms for the hand rest can include a locking mechanism which functions to retain a static position of the hand rest at a point customized to the user (e.g., selected by user). Locking mechanisms can include: pin in hole, ratcheting, threading, friction-based, or other suitable locking mechanisms. Locking mechanisms can have finite (e.g., where a user can select and set a predetermined/preferred position) or infinite adjustability (e.g., for maximum variability/customizability). Locking mechanisms can be manually operated and/or automatic (e.g., motorized, automatic adjustment with non-back drivable gearing, etc.). However, locking mechanisms can be otherwise suitably implemented.

Preferably, the locking mechanisms, sliding, and/or pivoting adjustment mechanisms are arranged below the hand rest, which can avoid infringing on the range of motion of the hand, avoid irritation and discomfort for the user, and reduce the likelihood of accidental disturbance (e.g., unlocking) during operation of the inceptor. However, the inceptor can include any other suitable adjustment mechanisms arranged in any suitable manner.

Preferably, the hand rest is rigidly coupled to the grip and/or otherwise transfers forces/displacements to the primary axes of the inceptor (e.g., X, Y, Z), however the hand rest can alternately use semi-flexible couplings, include a control axis between the palm rest and grip, and/or include any other suitable mounting relative to the grip.

The hand rest can have any suitable shape or geometry. Preferably, the dorsal and palmar flanges are concave across a midplane (e.g., including vertical/lateral directions), forming a groove in which the blade of the hand can nest. Preferably, the hand rest is convex in the lengthwise direction (e.g., with the distal and/or proximal flanges sloping downwards). The hand rest can be saddle-shaped (e.g., concave down along length and concave up along width), flat, arcuate, form a valley (e.g., groove), and/or have any other suitable geometry.

Figure 27A:
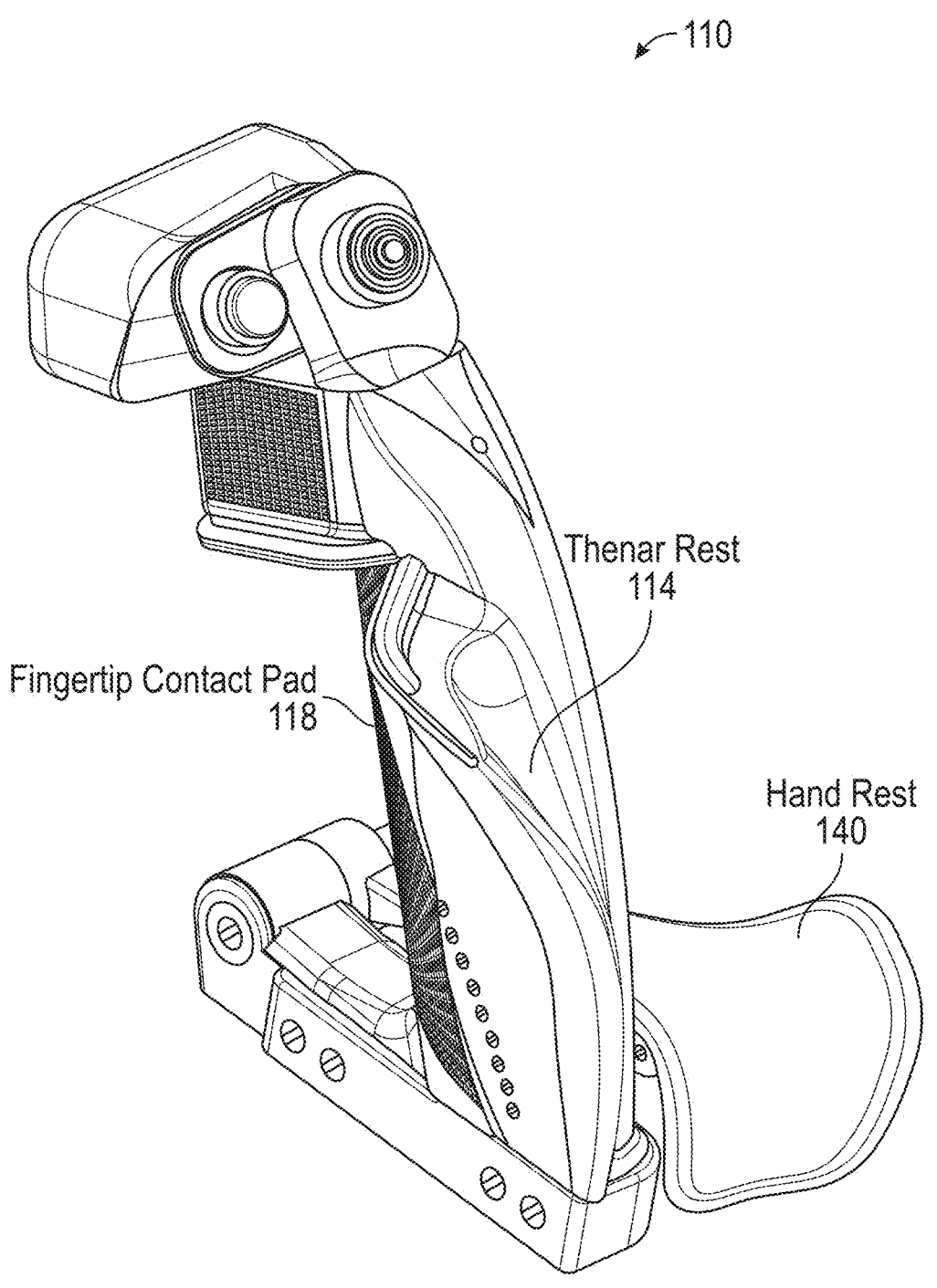
FIG. 27A to FIG. 27N are views of an inceptor grip in a variant of the system.
Figure 27B:
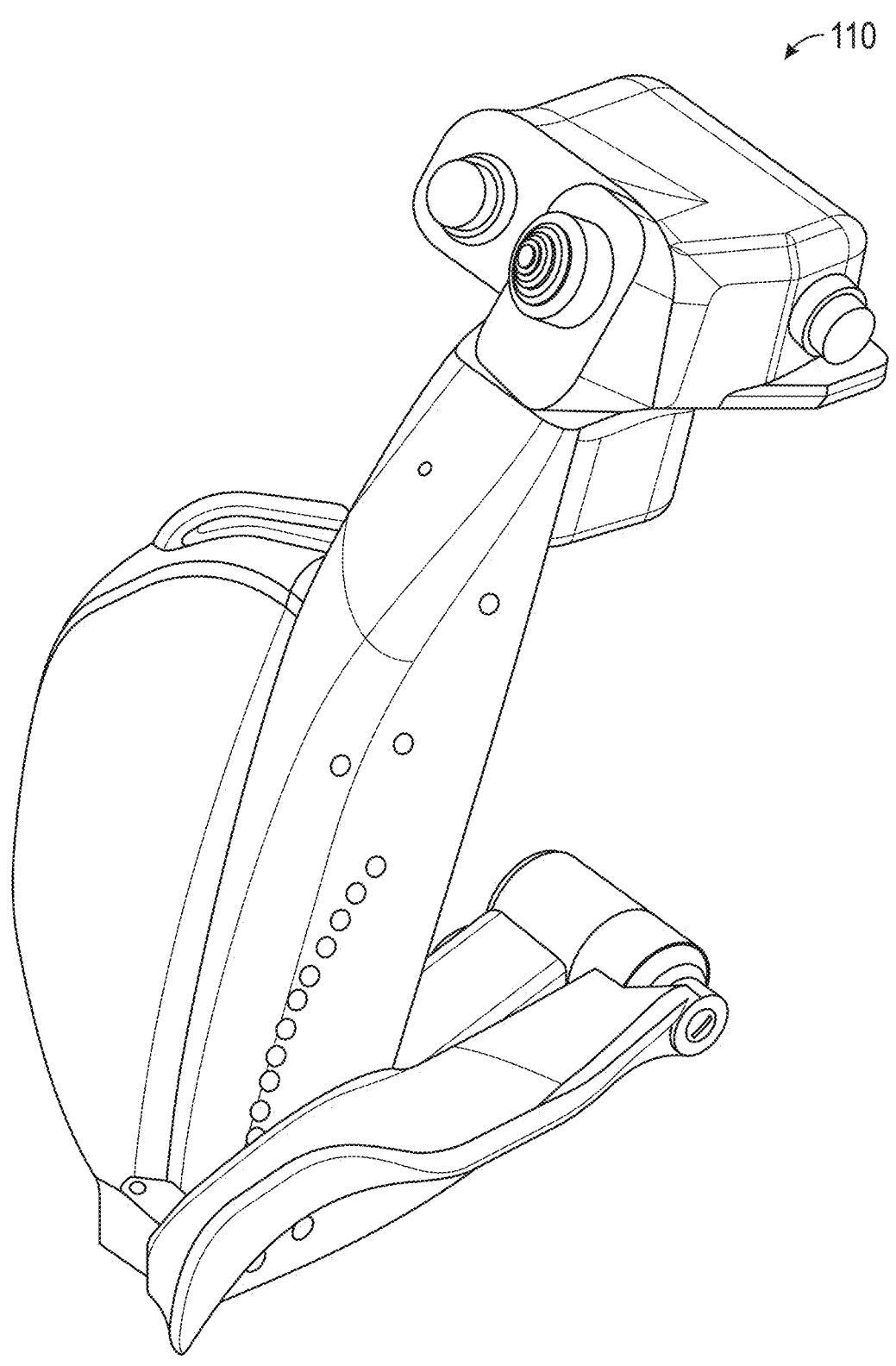
Figure 27C:
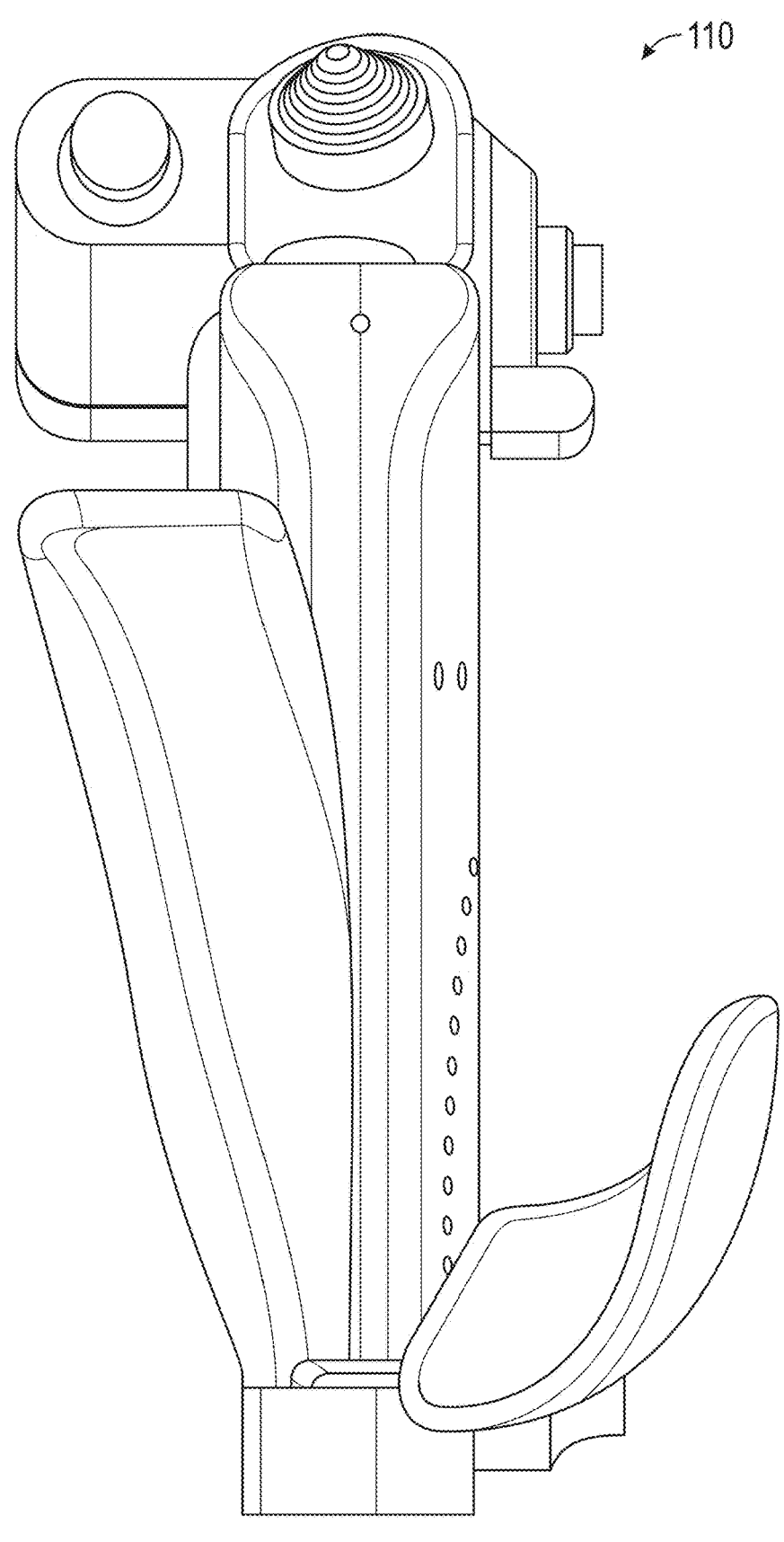
Figure 27D:
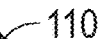
Figure 27E:
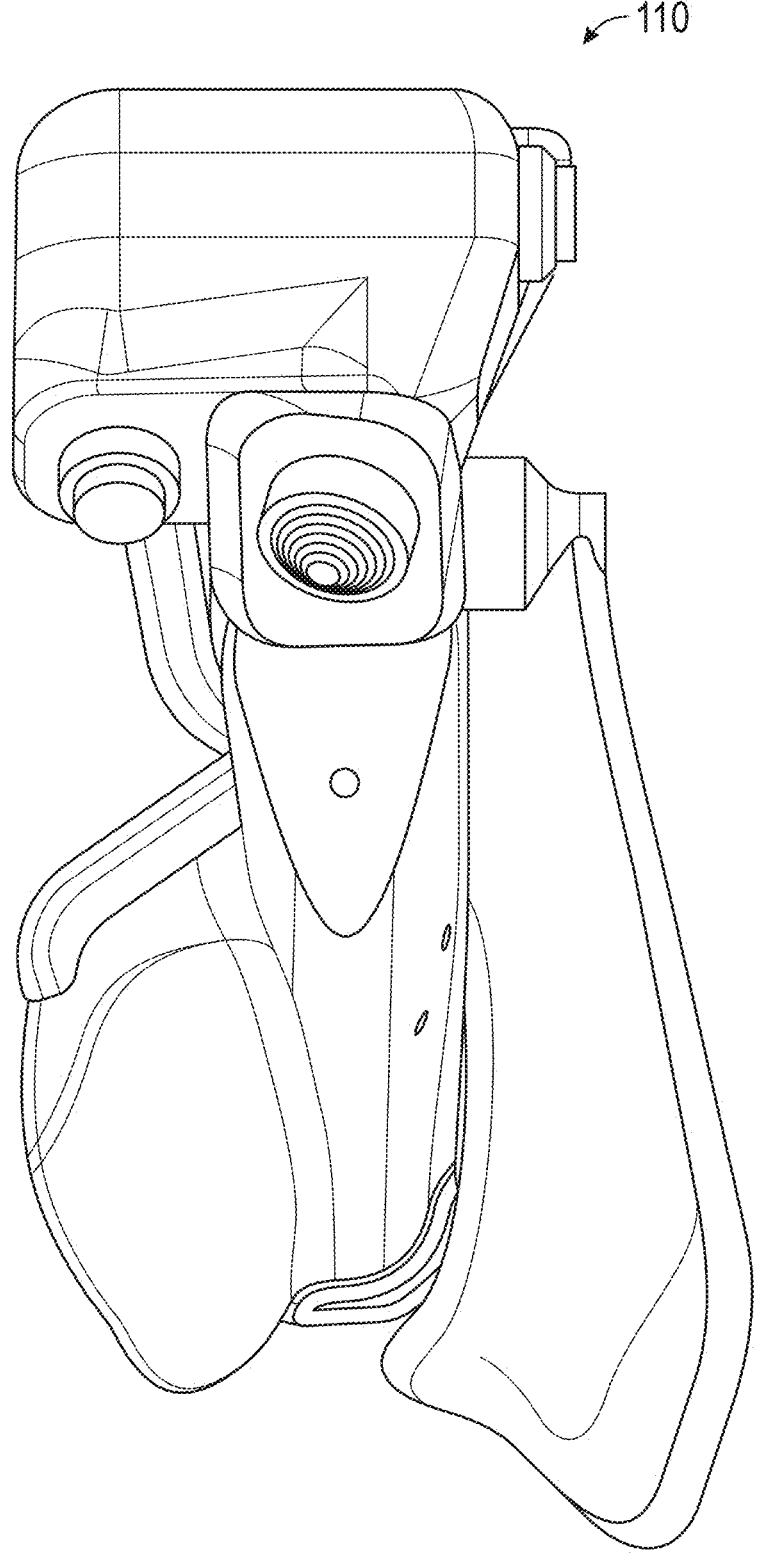
Figure 27F:
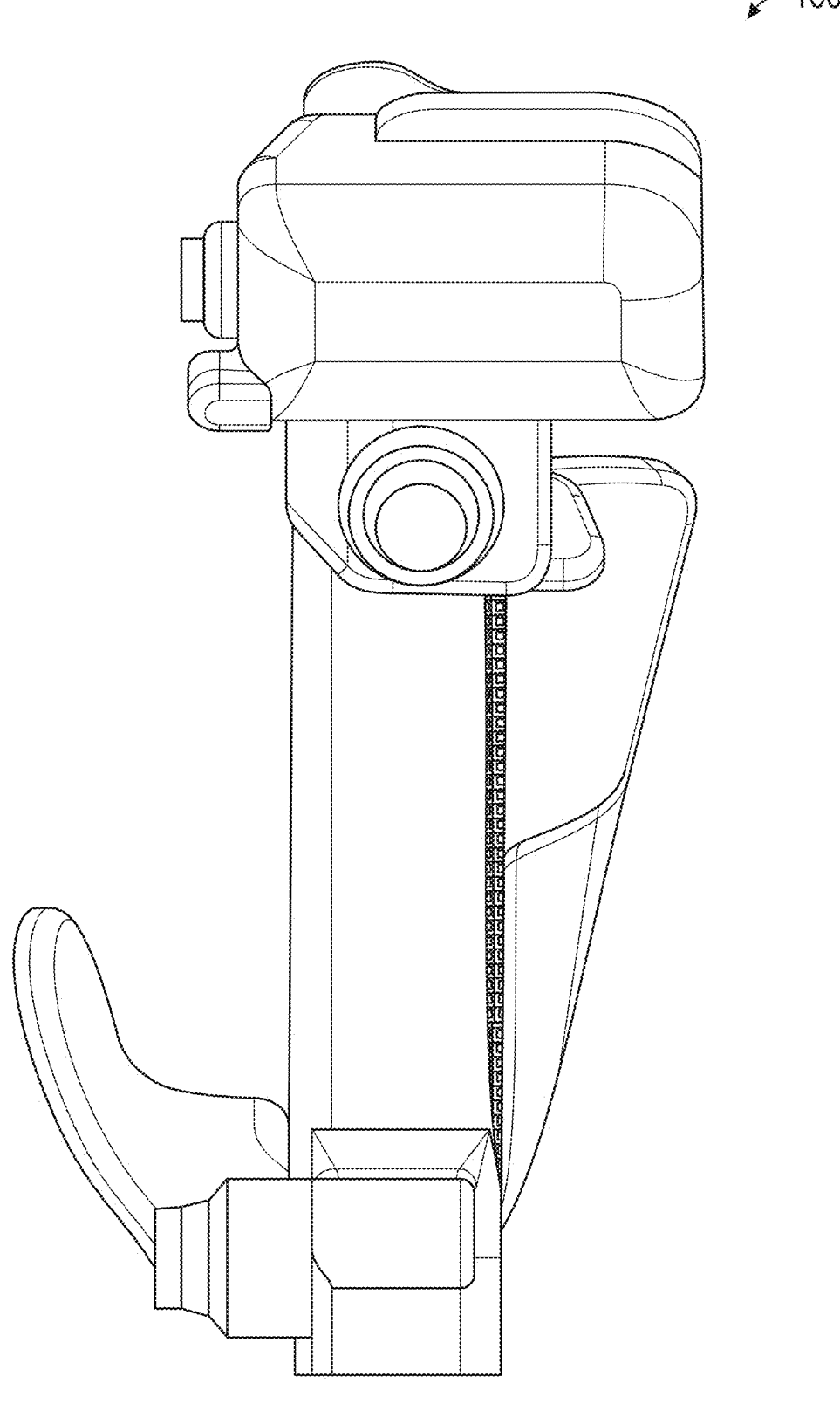
Figure 27G:
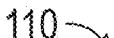
Figure 27G:
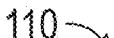
Figure 27H:
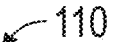
Figure 27H:
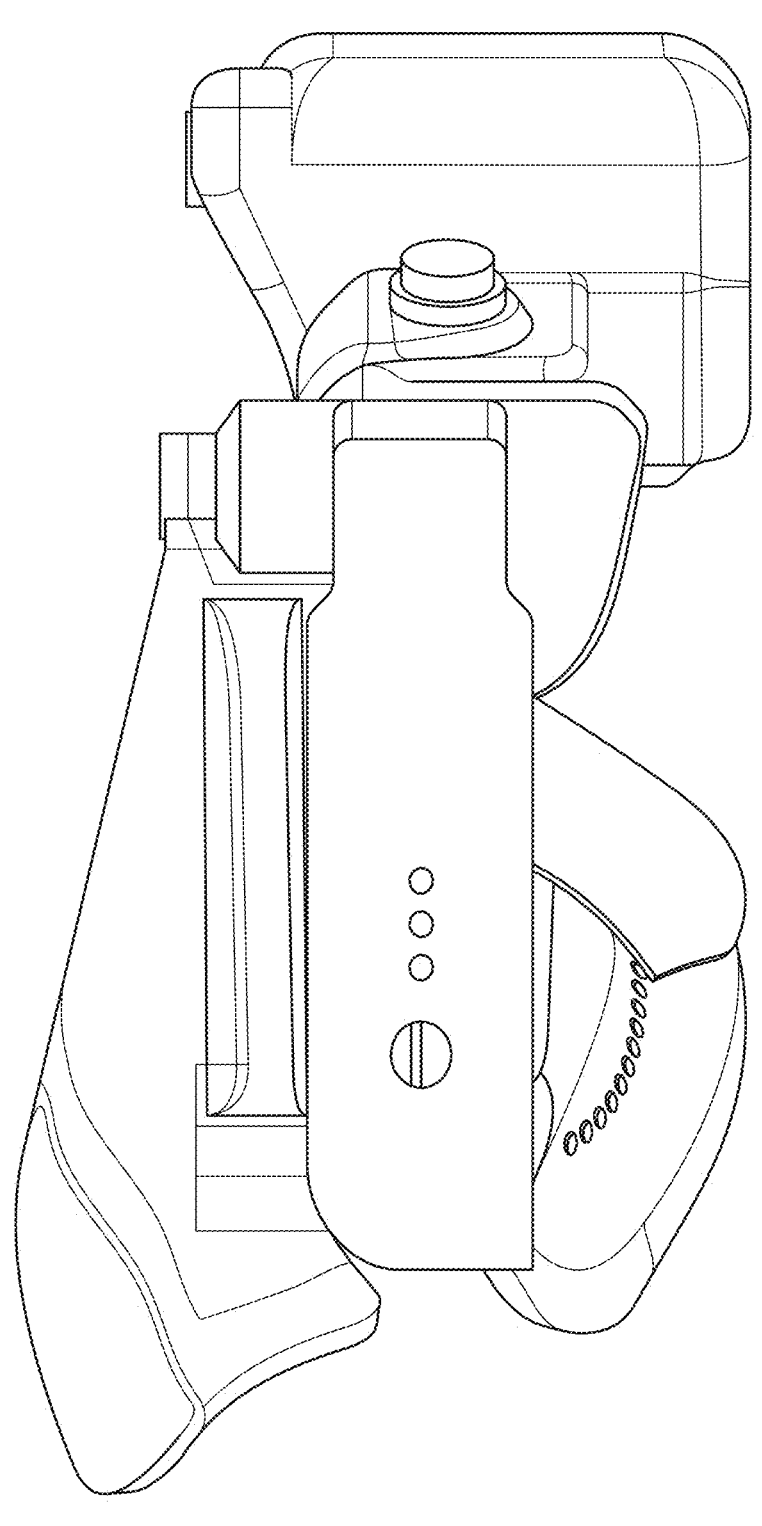
Figure 27I:
Figure 27J:
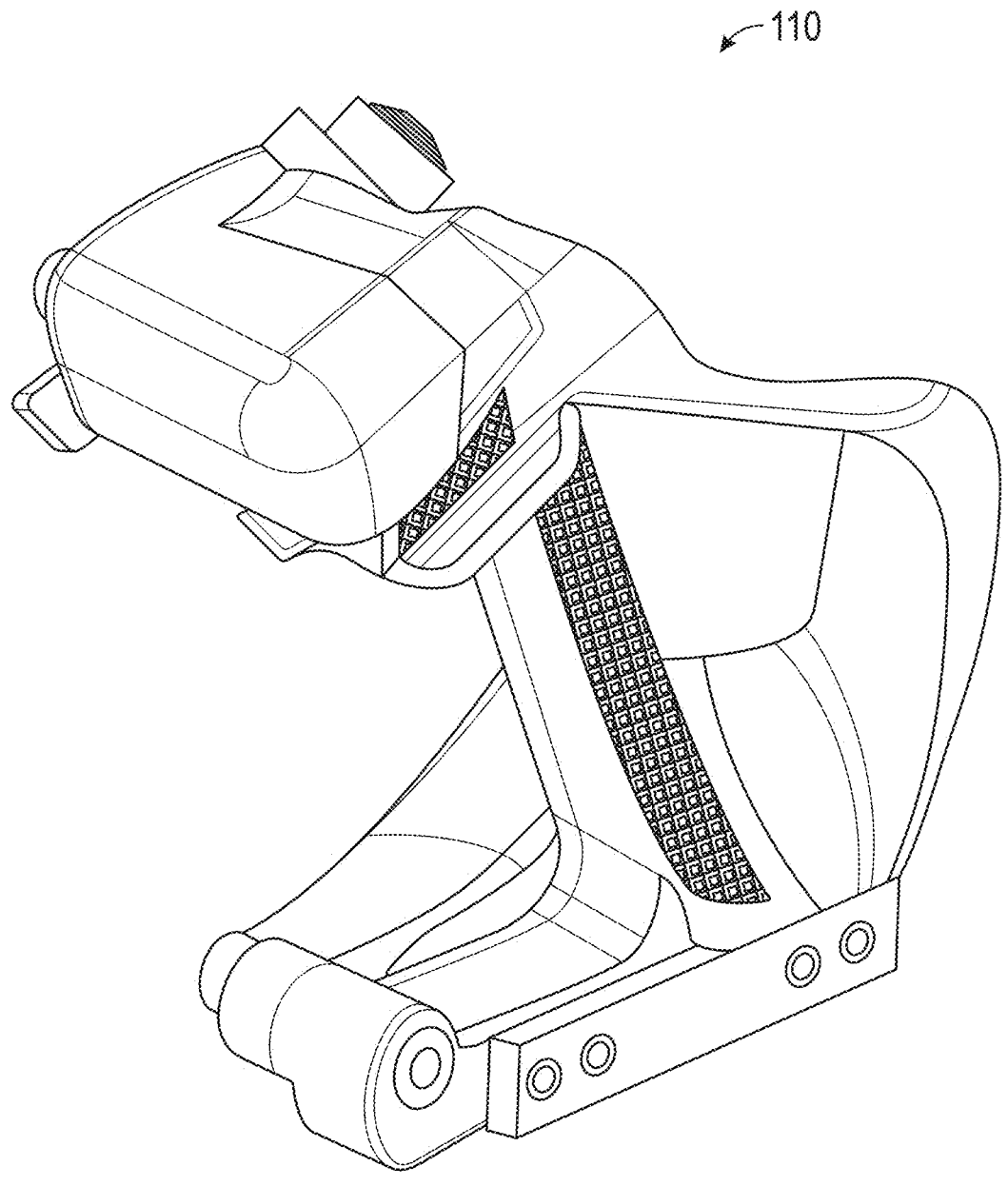
Figure 27K:
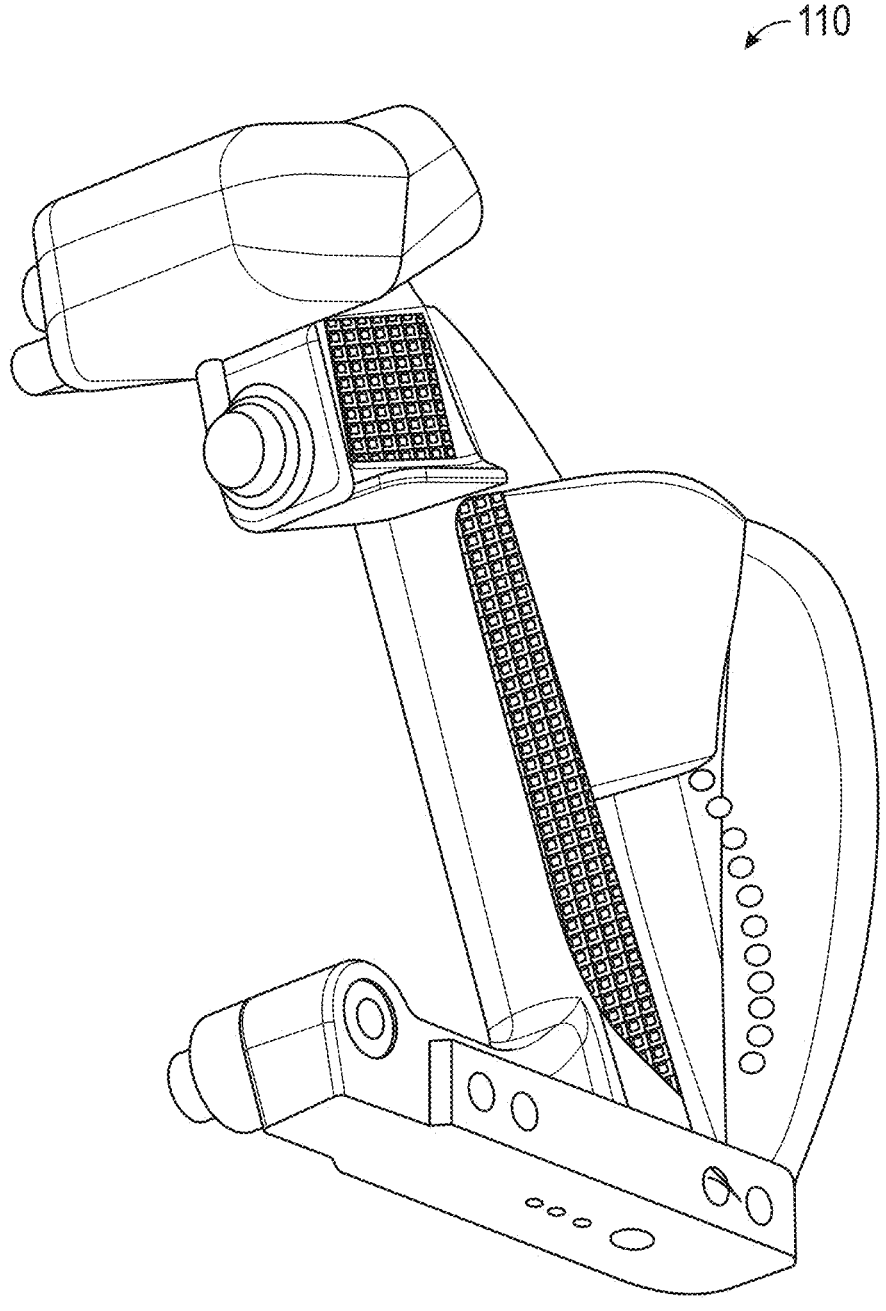
Figure 27L:
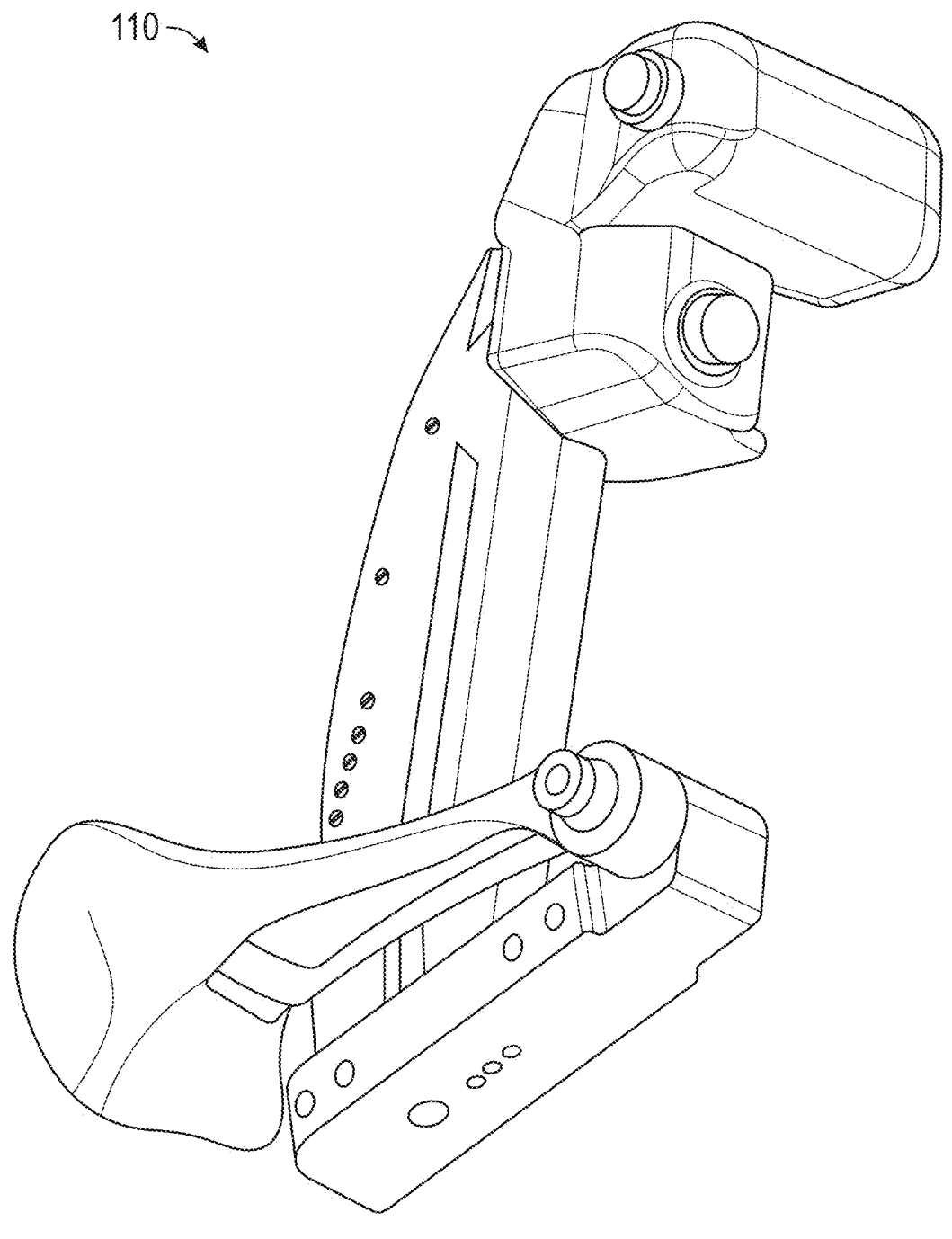
Figure 27M:
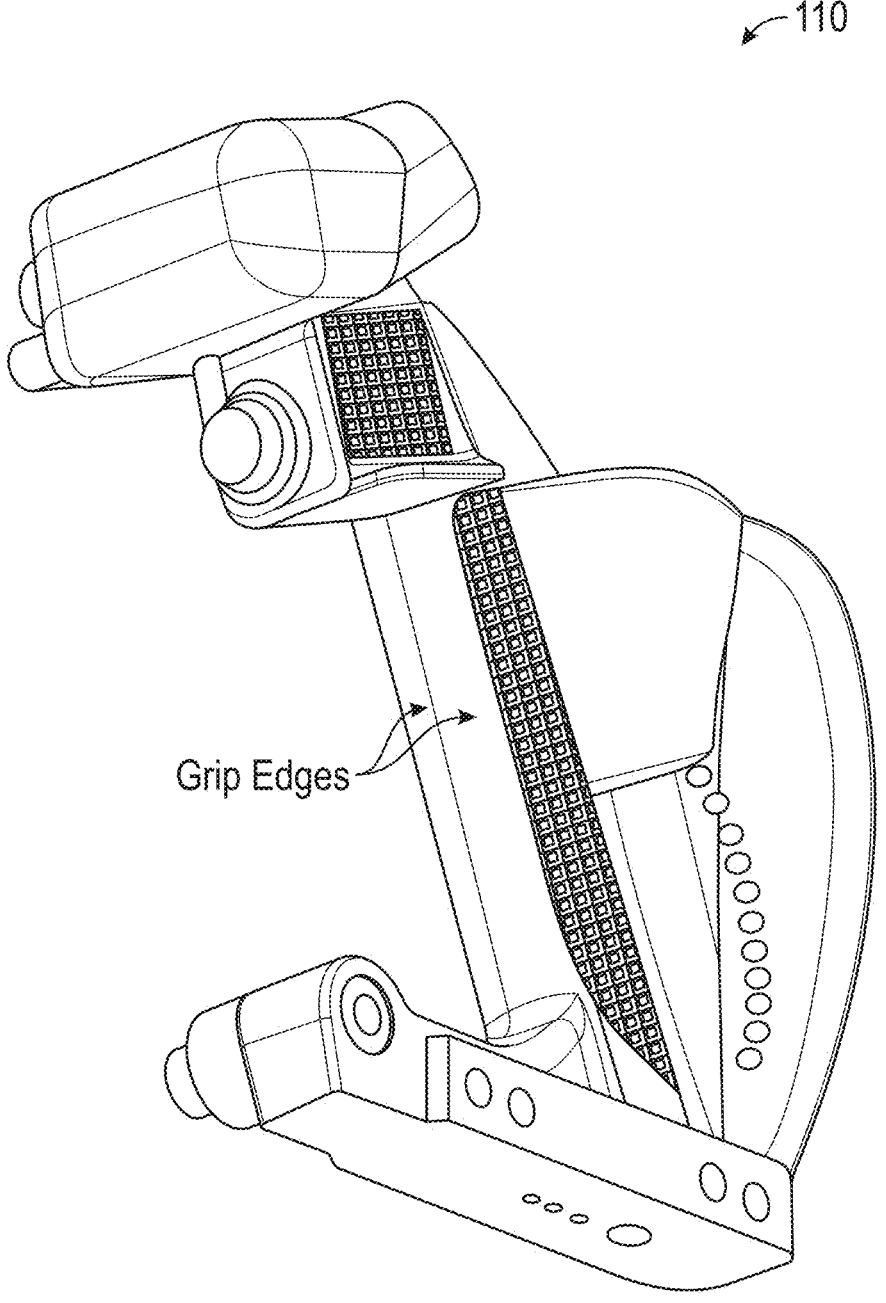
Figure 27N:
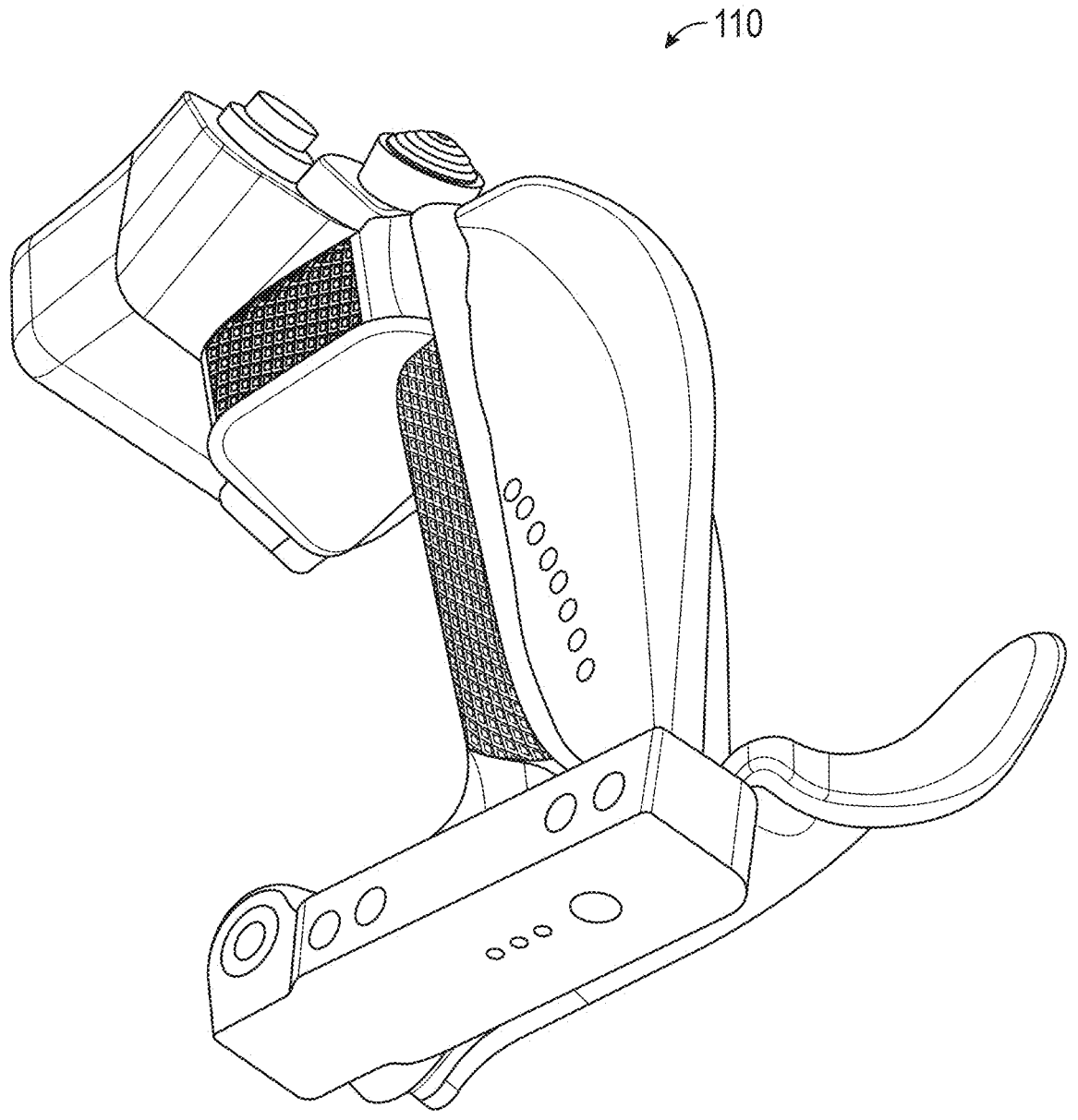
Figure 28A:
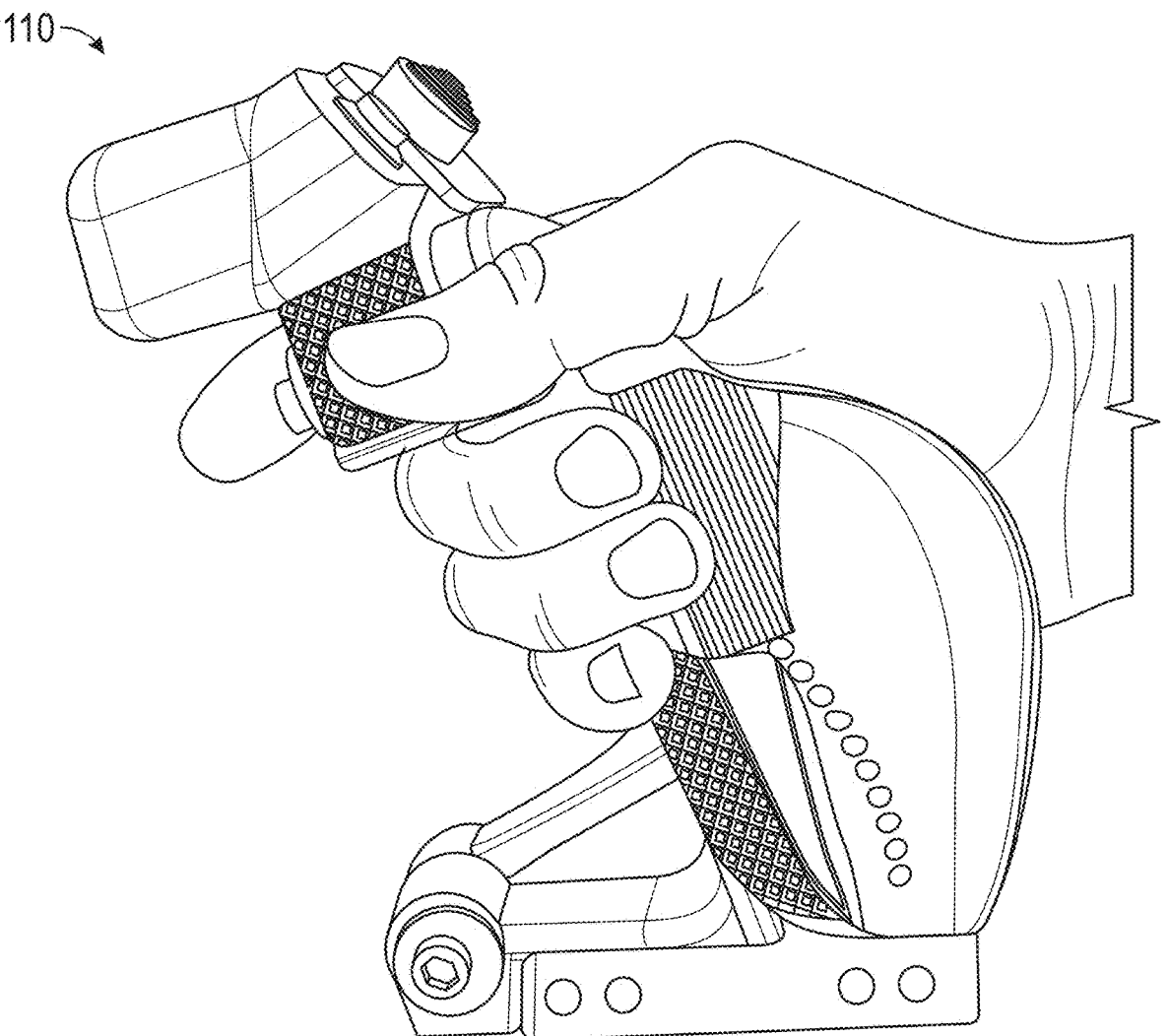
FIG. 28A to FIG. 28B are side views of a variant of an inceptor grip illustrating thumb mobility.
Figure 28B:
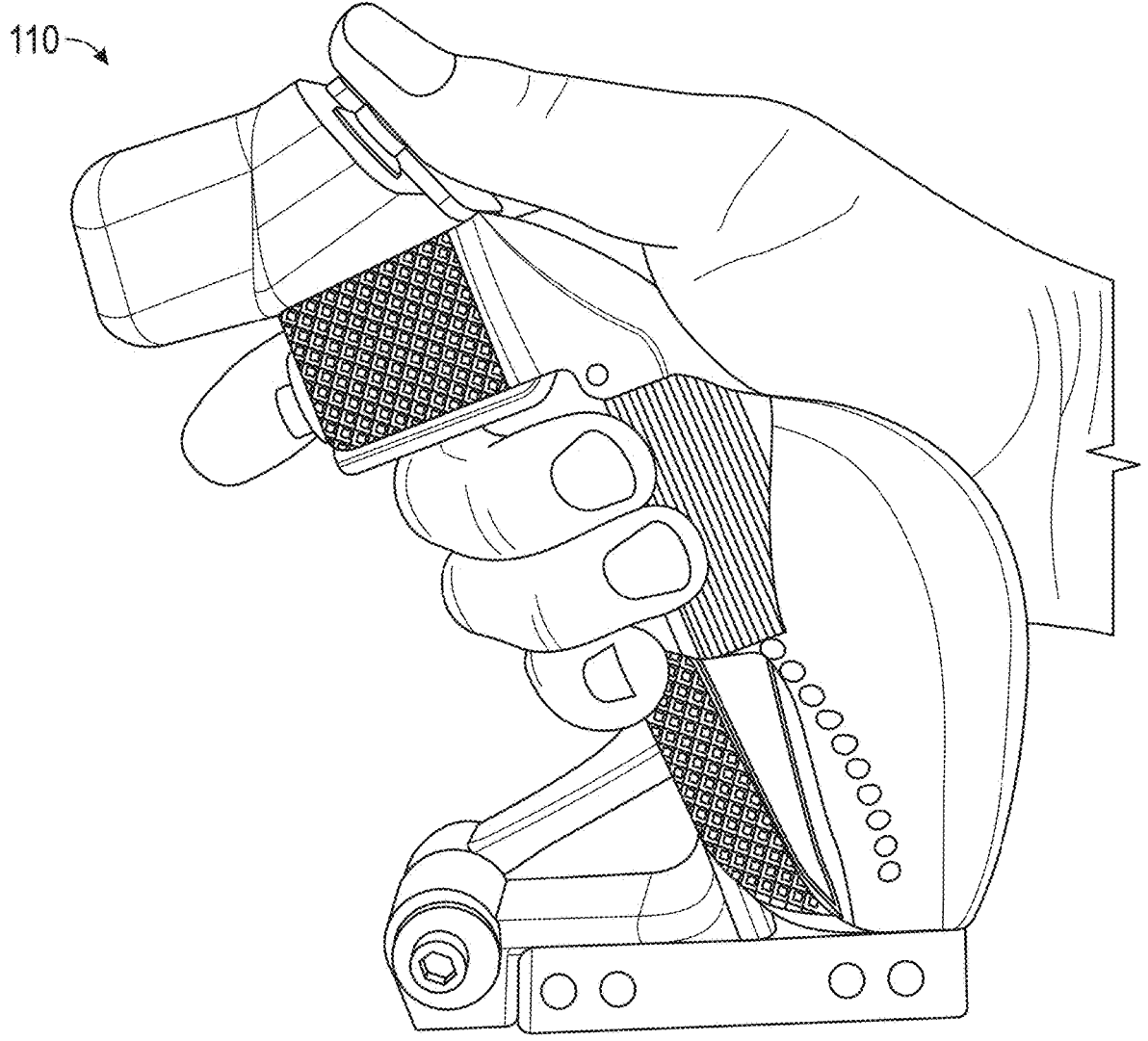
Figure 29A:
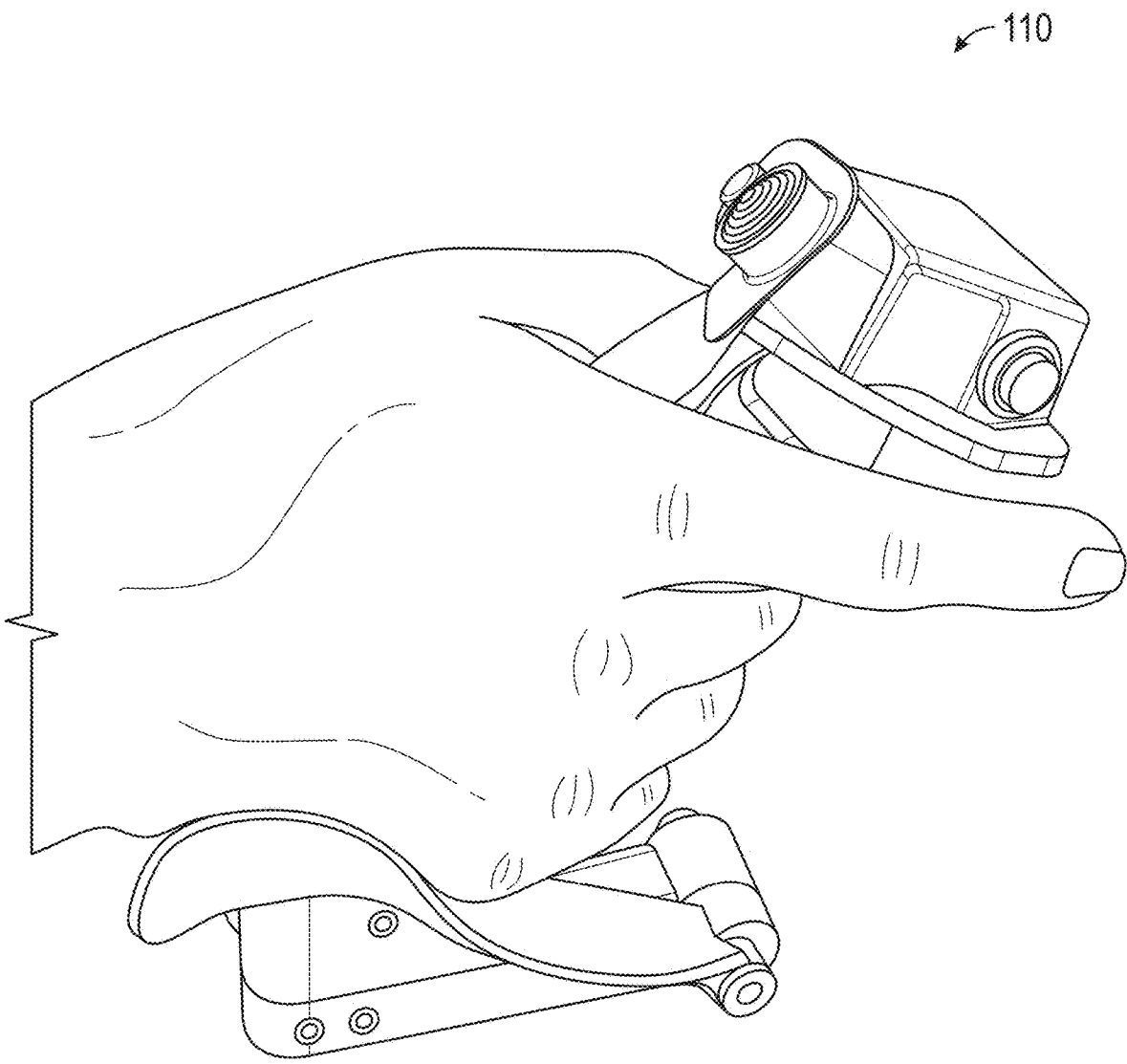
FIG. 29A to FIG. 29B are 3D views of a variant of an inceptor grip being manipulated by a hand with a relaxed thumb and index finger.
Figure 29B:
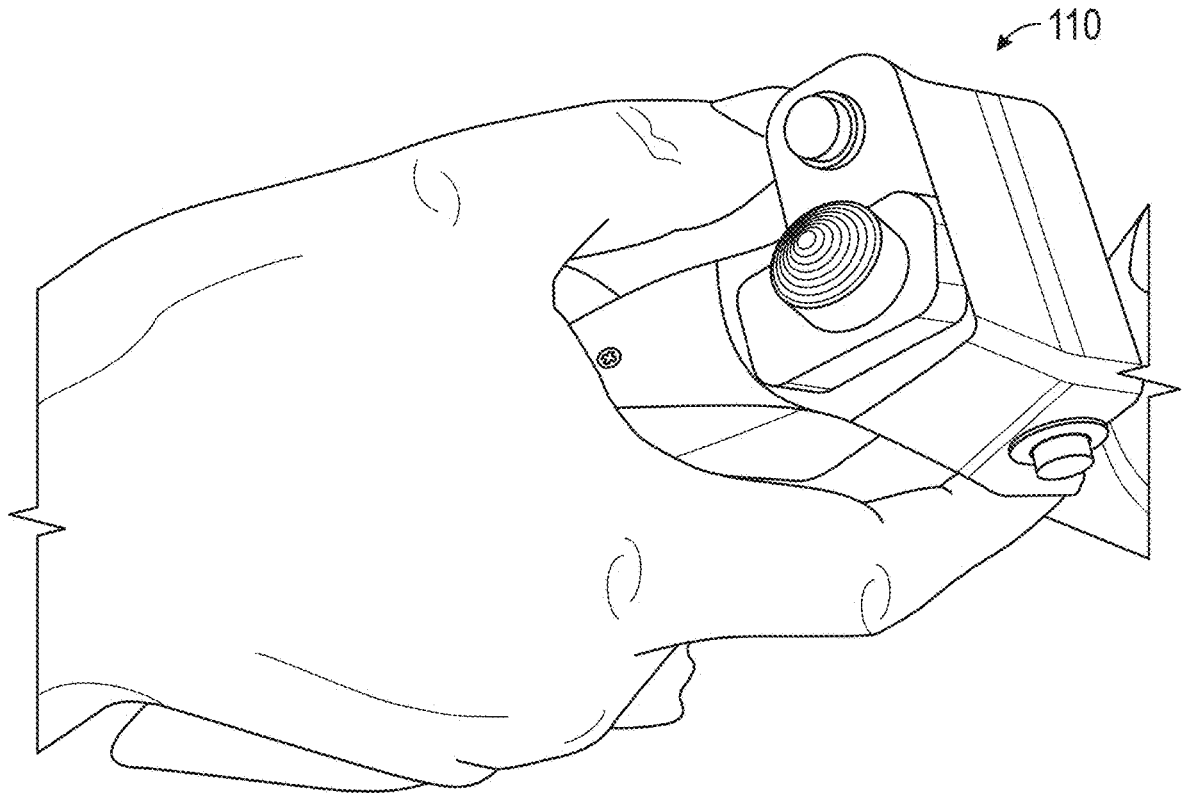

The inceptor preferably includes an inceptor grip (a.k.a. "shaft" or "grip shaft") which functions to engage the purlicue, palmar side of the hand (e.g., thenar, hypothenar, phalanx base), and/or fingers to improve inceptor ergonomics (an example inceptor grip is shown in FIG. 27A to FIG. 27N). The grip can additionally or alternately function to structurally support one or more binary inputs and/or input axes. The inceptor can optionally function to provide haptic reference for the user to enable non-visual operation of one or more binary inputs and/or input axes. The spine of the grip can be straight, curved, arcuate, and/or have any other suitable geometry. In a first variant, the grip is curved with constant radius. In a second variant, the grip is curved with variable radius. In a third variant, the grip is curved about the palm blade rest pivot point. The grip can define any suitable angle relative to the base and/or mounting surface (e.g., in a neutral position), which can be towards the user (or seat of the user), away from the user, and/or any other suitable angle.

The grip can include any suitable set of grip edges along a length of the spine, which functions to engage (e.g., slightly 'dig into') the pads of a user's fingers. As an example, the grip edges can increase the rotational force that a user can apply when compared to a smooth/sloped surface. Additionally, grip edges can function to increase the flexibility of a grip to accommodate different hand sizes, since a hand can naturally deviate from the surface of the grip between pairs of edges without influencing the maximum torque the user can apply. Grip edges can be formed by relief of a flat face on the grip which deviates from a smooth surface of the grip. Alternatively, grip edges can be formed by a flat, arcuate, or arched surface running a partial length of the spine of the grip (e.g., substantially parallel to the twist/Z-axis of the grip). The surface between the pairs of grip edges can be a minimal surface, a monoclastic surface (e.g., arching with the spine), a synclastic surface (e.g., convex, etc.), a flat surface, a semi-cylinder, and/or any other suitable surface. Grip edges can be arranged on a rear (distal) side of the grip opposing a user and/or can extend crossways within/across finger grooves. Grip edges can have a fillet radius, such as less than a threshold fillet radius of: 3 mm, 2 mm, 1 mm, 0.5 mm, 0.25 mm, and/or any other suitable fillet radius. Alternatively, grip edges can be chamfered, blunted, or otherwise formed.

The grip can be manufactured from any suitable material(s), which can include: plastic, metal, composite, and/or any other suitable material. The grip can be manufactured by any suitable process, and can be: injection molded, rotational (roto) molded, extrusion blow molded, injection blow molded, reaction injection molded, vacuum cast, thermoformed, compression molded, cast (die cast, sand cast, investment cast, pressure cast, etc.) die forged, formed, rolled, layup, and/or any other suitable manufacturing technique. The grip can include an exterior grip material of the same material or different material from the body of the grip, which can include: rubber padding, external texture padding, knurling (e.g., metal, plastic, rubber, etc.), and/or any other suitable grip.

The grip can optionally include a thumb groove 112, which functions to enable haptic and/or non-visual positioning of the thumb relative to one or more inputs of the inceptor. The thumb groove is preferably on the side of the inceptor grip opposing the hand rest, but can additionally or alternately be arranged on the top of the inceptor grip, rear of the inceptor grip, left side, right side, and/or otherwise arranged. The thumb groove can be located at any suitable height along the inceptor grip—preferably the thumb groove at least 8.3 cm (95.sup.th percentile male hand breadth) above the base of the grip and/or minimal point of the hand rest (e.g., in the lowest configuration), but can be 5 cm, 7 cm, 8 cm, 9 cm, 10 cm, 11 cm, 15 cm, any range bounded by the aforementioned values, and/or any other suitable height along the inceptor grip. Preferably, the thumb groove is substantially oriented towards (e.g., terminating at, containing and enclosing, etc.) the A-input axis (e.g., thumb axis), thumb wheel, and/or a roller wheel, but can be oriented towards any suitable axis, towards the top of the inceptor, and/or any other suitable binary input or input axis. Alternatively, the thumb groove can be oriented towards no inputs, (e.g., such as for ergonomics and improved control authority). The thumb groove is preferably tapered towards the front and/or base of the grip, but can be straight cut, notched, formed from a flange or protrusion in the inceptor grip, mounted to the inceptor grip, relieved from the inceptor grip, and/or otherwise implemented.

The grip can include a thenar rest 114 (e.g., "thenar brace") which functions to engage a thenar eminence (e.g., thenar portion) of the hand of the user. The thenar rest can additionally or alternatively function to improve a user's grip during twist (e.g., wrist flexion, outboard twist, clockwise twist for a right-handed inceptor). The thenar rest is preferably integrated into the body of the grip and/or formed with the grip, but can additionally or alternatively be a separate component mounted to the grip or can be integrated into the hand rest (e.g., can be adjustable with the hand rest). In variants, the thenar rest can form all or a portion of the thumb groove, but can be otherwise suitable integrated into the grip. The thenar rest can include a groove which extends beyond the hand rest in one or more configurations (e.g., when the hand rest is raised, shortening an effective length of the inceptor, such as for a smaller hand). The thenar rest can include a groove having the same dimensions and/or characteristics as the thumb groove, or a different geometry. The width of the groove can be 0.5 cm, 1 cm, 2 cm, 3 cm, 4 cm, any range bounded by the aforementioned values, and/or any other suitable width. The groove can be straight, curved (e.g., concave monoclastic, concave anticlastic, saddle-shaped, etc.), trace a partial helix or 3D spiral (e.g., sweep a rotation and a translation about the Z-axis and/or a central axis of the spine), tapered (e.g., narrowing towards a base of the inceptor) and or be otherwise formed. The groove can have a relative width (e.g., for a particular cross section taken relative to a base plane of the inceptor, such as cooperatively defined by the x/y axes), which can be: less than an width of the inceptor (e.g., taken perpendicular to a the width of the groove), half the width of the inceptor, one quarter of the width of the inceptor, and/or any other suitable relative dimension. The groove is preferably formed by a protrusion along a proximal portion of the grip (e.g., extended surface, fin, etc.; oriented towards a user, extending substantially parallel to the heel of the hand), but can additionally or alternatively include a relieved section of a convex profile of the remainder of the grip. The thenar rest can span 3 cm, 5 cm, 8 cm, 10 cm, 12 cm, greater than 12 cm, and/or any other suitable length along the inceptor grip. However, the inceptor grip can include (or be used with) any other suitable thenar rest and/or otherwise exclude a thenar rest.

In one variant, the thenar rest can include a syncline-shaped groove wherein, for a cross section of the grip parallel to a base plane (e.g., X/Y plane) of the grip, a width of the syncline-shaped groove is greater than 30% of a characteristic dimension of the grip. In an example, the width of the syncline-shaped groove defines a first vector in plane with the cross section, wherein the width of the syncline-shaped groove is substantially equal to (e.g., exactly equal, within 5%, within 10%, within 20%, etc.) a thickness of the grip in a direction perpendicular to the first vector (in the cross sectional plane).

The grip can optionally include a set of finger grooves 116, which function to enable haptic and/or non-visual positioning of the index and/or middle finger relative to one or more inputs of the inceptor. The finger grooves are preferably on the same side of the inceptor grip as the hand rest, but can alternately be arranged on the rear of the grip, top of the grip, underside of the grip, and/or in any other suitable location. The finger grooves are preferably oriented substantially towards (e.g., terminating at, containing and enclosing, etc.) one or more control axes or binary inputs, but can alternately be oriented towards no inputs. The grip can include 0, 1, 2, 3, or more than 3 finger grooves, which can be designated to engage the user's index finger, middle finger, ring finger, a non-dominant thumb, a finger on a non-dominant hand, and/or any other suitable body part. In a specific example, the grip includes a first finger groove and a second finger groove, formed in a stair-step pattern on the rear of the inceptor grip.

The grip can include a fingertip contact pad 118 (e.g., "finger wall") which functions to engage the fingertips of the hand and/or functions to reduce the twist effort required to generate the same effective moment (e.g., during wrist flexion). The fingertip contact pad can be planar (e.g., substantially flat), but can be convex, concave, and/or have any other suitable shape. The fingertip contact pad can be arranged: at a terminal end of the finger groove, within the finger groove, on a back side of the thenar rest (e.g., opposing the surface engaging the thenar eminence), offset from a face of extending between a pair of grip edges (e.g., substantially parallel to the face, etc.), and/or otherwise suitably arranged. In variants, a surface normal of the fingertip contact pad substantially opposes a surface normal of the thenar rest (e.g., defining a skew angle within 45 degrees of direct opposition, direct opposition. In variants, the surface normal of the fingertip contact pad is parallel with a tangent plane of the spine of grip (e.g., about the Z-axis), but can be otherwise arranged. The fingertip contact pad is preferably textured or knurled, but can be otherwise constructed with a material having a high frictional coefficient when engaged with a human fingertip (e.g., frictional coefficient of 130% that of the surface of the inceptor spine, greater than the frictional coefficient of the remainder of the spine, etc.). The contact pad can be configured to engage an individual finger (e.g., digit associated with a finger groove) or a plurality of fingers (e.g., third, fourth, and fifth digits of the hand; 2 finger, 3 fingers, 4 fingers, etc.). The height of the contact pad (e.g., evaluated along the length of the Z-axis) can be less than 1 cm, 1 cm, 2 cm, 3 cm, 5 cm, 7 cm, greater than 7 cm, any range bounded by the aforementioned values, and/or any other suitable height. In variants, the base of the contact pad can be arranged below the nadir of the hand rest (e.g., in a raised position of the hand rest), can be substantially aligned with a base/lower end of the thenar rest, and/or can be otherwise arranged. The width of the contact pad (e.g., evaluated radially, for a particular cross section) can be: less than 0.5 cm, 1 cm, 1.5 cm, 2 cm, 3 cm, any range bounded by the aforementioned values, and/or any other suitable width. The contact pad can be: integrated into a unitary body of the inceptor grip, integrated into the hand rest, integrated into the thenar rest (e.g., backside of the protruding fin along the spine of the inceptor), mounted to the grip (e.g., of separate material manufacture or mounting; protruding fin/flange separate from and adjacent to the thenar rest), and/or otherwise formed. However, the inceptor grip can include any other suitable fingertip contact pad.

However, the grip can include any other suitable grooves in any suitable arrangement and/or haptic reference geometry.

The inceptor grip and/or inceptor can support any suitable secondary input axes, which can include: triggers, roller wheels (e.g., thumb wheels), rollers, joysticks, levers, knobs, sliders, and/or any other input axes, which can be controllable by the thumb, index, and/or middle fingers. The inceptor can additionally include any suitable binary inputs such as buttons, switches, D-pads, binary triggers, binary levers, and/or any other suitable binary inputs.

In a first variant, the inceptor includes an A-input (e.g., thumb axis) arranged on the opposite side of the grip as the hand rest and disposed at the end of a thumb groove.

In a second variant, the inceptor includes a stick trim 4-way switch, height rate command button, flight control system (FCS) paddle switch, mode disengage trigger, accelerate to wing-borne flight button (airspeed target button), decelerate to hover button, and an A-axis. In a first example, the A-axis is a thumb wheel. In a second example, the FCS paddle switch is adjacent to the palmar side of the palm blade rest, and is configured to be actuated by a flexion of the small finger (e.g., with palm blade relaxed/neutral on the hand rest). In a third example, the airspeed target button is arranged on top of the inceptor grip and is controllable by the thumb (e.g., with thumb not within thumb groove and no requirement for simultaneous use of A-input and airspeed target button). In a fourth example, the decelerate to hover button is arranged on top of the inceptor grip and is controllable by the thumb (e.g., with thumb not within thumb groove and no requirement for simultaneous use of A-input and decelerate to hover button). In a fifth example, the stick trim 4-way switch is arranged on top of the inceptor grip and is controllable by the thumb (e.g., with thumb not within thumb groove and no requirement for simultaneous use of A-input and decelerate to hover button). In a sixth example, the height rate command button is arranged at the end of the first finger groove, enabling simultaneous manipulation with primary axes and/or A-axis. In a seventh example, the mode disengage trigger is arranged at the end of the second finger groove, enabling simultaneous manipulation with primary axes and/or A-axis. In an eighth example, the A-axis (e.g., thumbwheel) does not self-center (automatically center), allowing the thumb to be removed without modifying the control input. In a ninth example, a lower portion (e.g., bottom) of the A-axis (such as a thumb wheel) can be exposed to and/or controlled by the middle or index finger, allowing the A-axis to be held in a specific position with the thumb free for other inputs. In a tenth example, a 'brake' on the A-axis can be actuated with other fingers (e.g., on same hand, different hand), retaining the position and associated input of the A-axis with the thumb free for other inputs. In an eleventh example, an index finger input component (e.g., button, trigger) can be aligned with the pitch yaw plane of the inceptor, such as defining a surface normal vector lying in a plane cooperatively defined by the inceptor pitch axis and the twist axis and/or defining a surface normal vector which substantially intersects the Z-axis.

In a third variant, the A-axis can be arranged on a side-stick inceptor (e.g., such as a left-handed inceptor, opposing-handed sidestick). The side-stick can be a single-axis inceptor (e.g., 'throttle' style) or a multi-axis inceptor. The side-stick is preferably self-centering (e.g., with a deadband and/or soft stops as in the other primary axes), but can alternatively not self-center and retain displacement positions, or can be otherwise suitably configured. The side-stick inceptor is preferably passive, but can alternatively be active and/or otherwise formed. In a specific example, the A-axis can be arranged on a second inceptor which can be the same (e.g., duplicative—such as for a second user) or different from the inceptor (e.g., mirrored grip, different grip, etc.).

The user can engage and/or manipulate any suitable portions of the inceptor and/or hand rest by any suitable motions and/or articulations. The user can engage the grip of the inceptor at: the left side, right side, front, rear, hand rest side, thumb rest side (or side opposite the hand rest), and/or any other suitable portion of the inceptor grip. The user can engage the hand rest at the proximal end (toward user), distal end (away from user), palmar flange (adjacent to grip), dorsal flange (peripheral side, opposing grip, etc.), thumb groove (side adjacent to grip, peripheral side, etc.). The user can engage the inceptor and/or other components of the system with any suitable portions of the hand, wrist, forearm, and/or other suitable body parts. The portions of the user's hand which control one or more axes can be: the dorsal side of the hand, the palmar side of the hand, the small finger (base, proximal portion, distal portion, palmar side, dorsal side, etc.), the blade of the hand (e.g., palmar side, dorsal side, ulnar border of hand, etc.), hypothenar section of hand, thenar section of hand, mid palm section of the hand, the heel of the hand, the fingers of the hand, the thumb, the purlicue, the upper pad of the hand, outer pad of the hand, and/or any other suitable portion of the hand. The user can manipulate the inceptor and other suitable components with any suitable motions of the wrist (such as: extension, flexion, ulnar deviation, radial deviation, and/or neutral position/motion), fingers (such as: extension, flexion, and/or neutral position/motion), forearm/elbow (such as supination, pronation, flexion, extension, and/or neutral position/motion), thumb (such as: palmar abduction, radial abduction, anteposition, retroposition, flexion, extension, and/or neutral position/motion), shoulder (such as: horizontal flexion or internal rotation, horizontal extension or external rotation, vertical flexion, vertical extension, abduction, adduction, and/or neutral position/motion), and/or any other suitable motions of any suitable user body part. It is noted that the human arm has excess degrees of freedom, and therefore some motions can be achieved by multiple combinations and/or permutations of articulations—it is assumed that any alternate combinations and/or permutations which substantially achieve the same engagement, inceptor behavior (e.g., in a particular axis), and/or command output can additionally or alternately be substituted for the articulations disclosed herein.

The primary axes, including the X-axis, Y-axis, and Z-axis, of the inceptor can be manipulated by any suitable set of user motions and/or corresponding inceptor contacts points.

Preferably, application of force on the distal flange (or distal portion of the hand rest) and/or pushing forwards (away from pilot) on the grip of the inceptor (e.g., thenar rest) can generate a net moment in a first direction (e.g., positive or negative) of the X-axis. Preferably, application of force on the proximal portion of the palm blade and/or pulling backwards (towards pilot) on the grip of the inceptor can generate a net moment in a second direction (opposing the first direction) of the X-axis.

Application of force on the dorsal flange (e.g., in an outward direction relative to the inceptor grip, right) can generate a net moment in a first direction (e.g., positive or negative) of the Y-axis. Additionally or alternately, a rightward (e.g., for a right handed inceptor) force on the inceptor grip by the thumb can generate a net moment in the first direction of the Y-axis. Application of force on the palmar flange (e.g., in an inward direction relative to the grip, left) can generate a net moment in a second direction (e.g., opposing the first direction) of the Y-axis. Additionally or alternately, a leftward force on the inceptor grip by the palm (e.g., palmar side, mid palm, etc.) can generate a net moment in the second direction.

Application of force on the proximal portion of the palmar flange and distal portion of the dorsal flange can cooperatively generate a net moment in a first direction (e.g., positive, negative) of the Z-axis. Additionally or alternately, application of force on the proximal portion of the inceptor grip (e.g., side engaging purlicue, near side; thenar rest) and distal portion of the dorsal flange can cooperatively generate a net moment in a first direction of the Z-axis. Application of force on the distal portion of the palmar flange and proximal portion of the dorsal flange can cooperatively generate a net moment in a second direction (e.g., opposing the first direction) of the Z-axis. Additionally or alternately, application of force on the distal portion of the inceptor grip (e.g., rear side; fingertip contact pad) and proximal portion of the dorsal flange can cooperatively generate a net moment in a second direction of the Z-axis.

Figure 13:
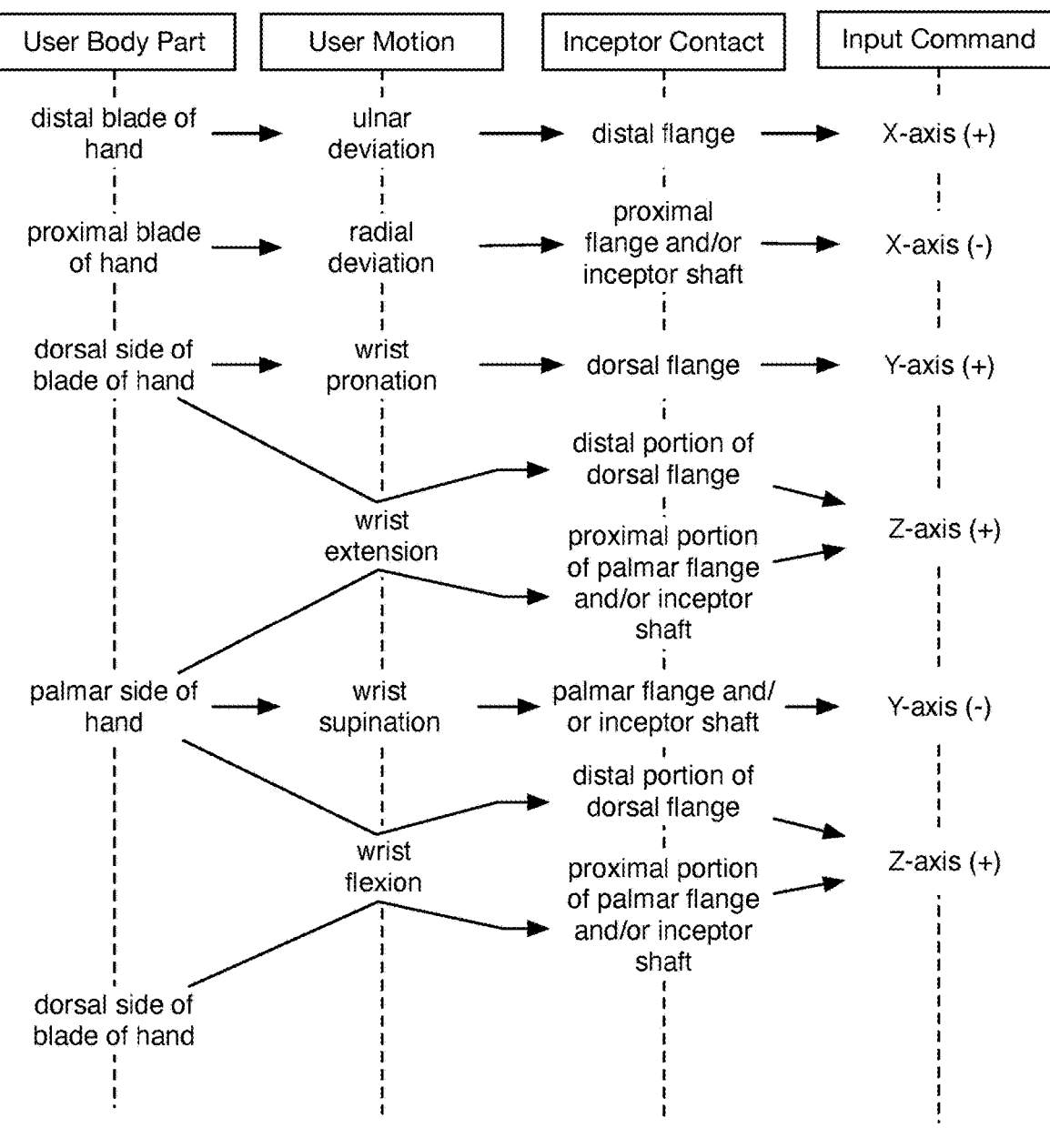
FIG. 13 is a diagram mapping user body parts and motions to input commands.

An example of inceptor contact mappings to input commands is illustrated in FIG. 13.

Figure 22A:
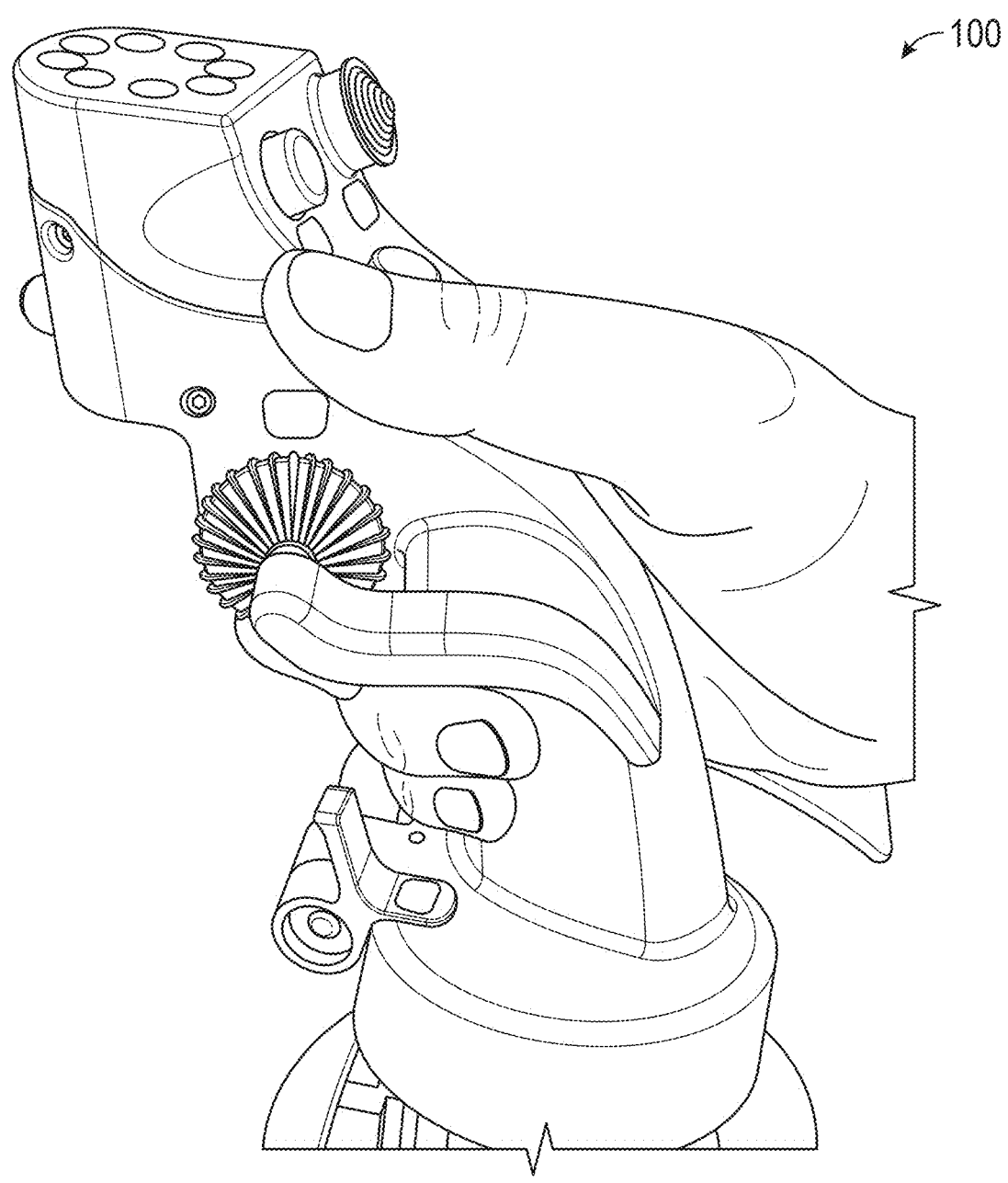
FIG. 22A to FIG. 22D are isometric view images of a variant of the system illustrating hand placement relative to the inceptor with the thumb: off of the thumb axis, contacting the thumb axis, displacing the thumb axis away from the user, and displacing the thumb axis towards the user, respectively.
Figure 22B:
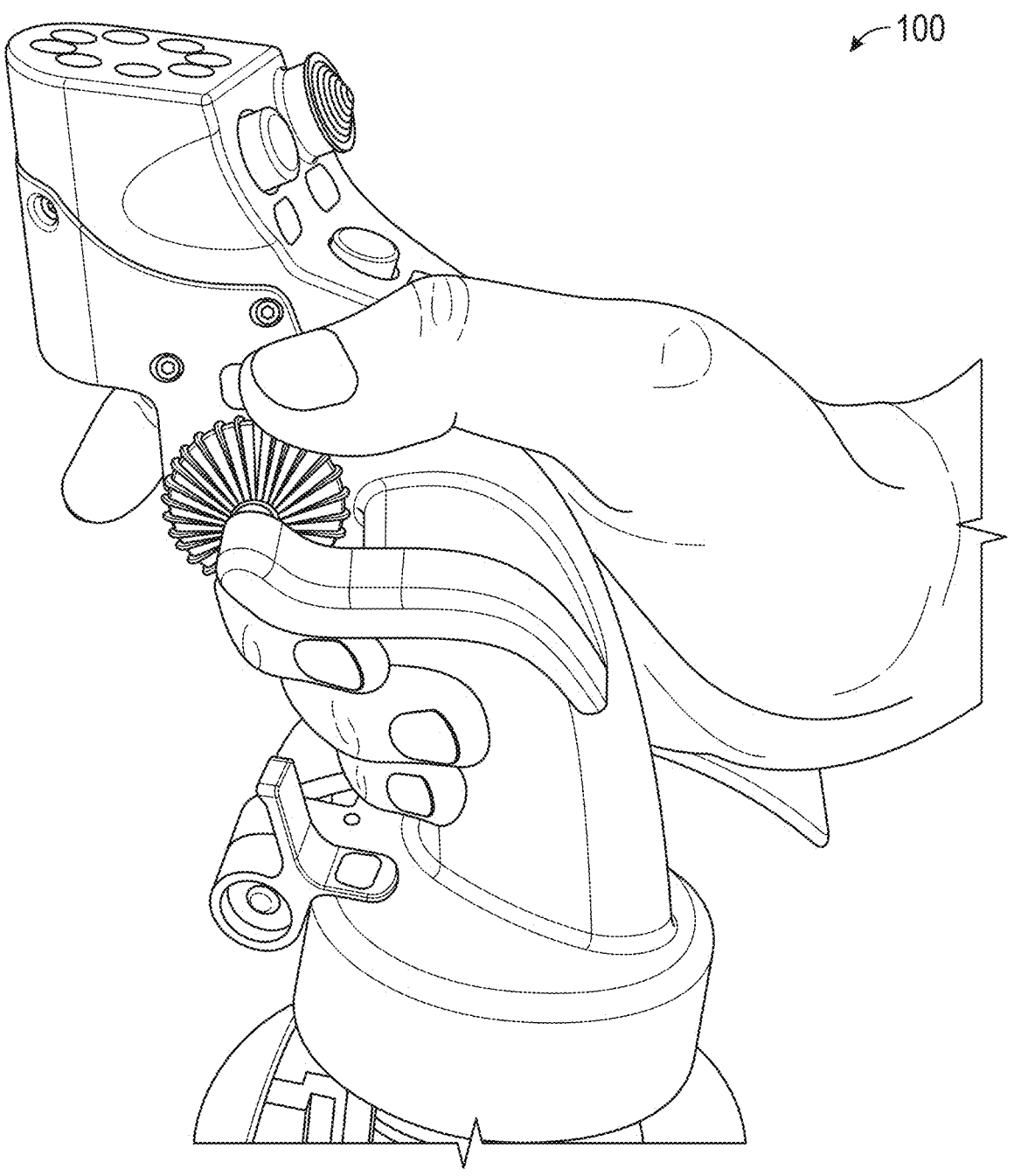
Figure 22C:
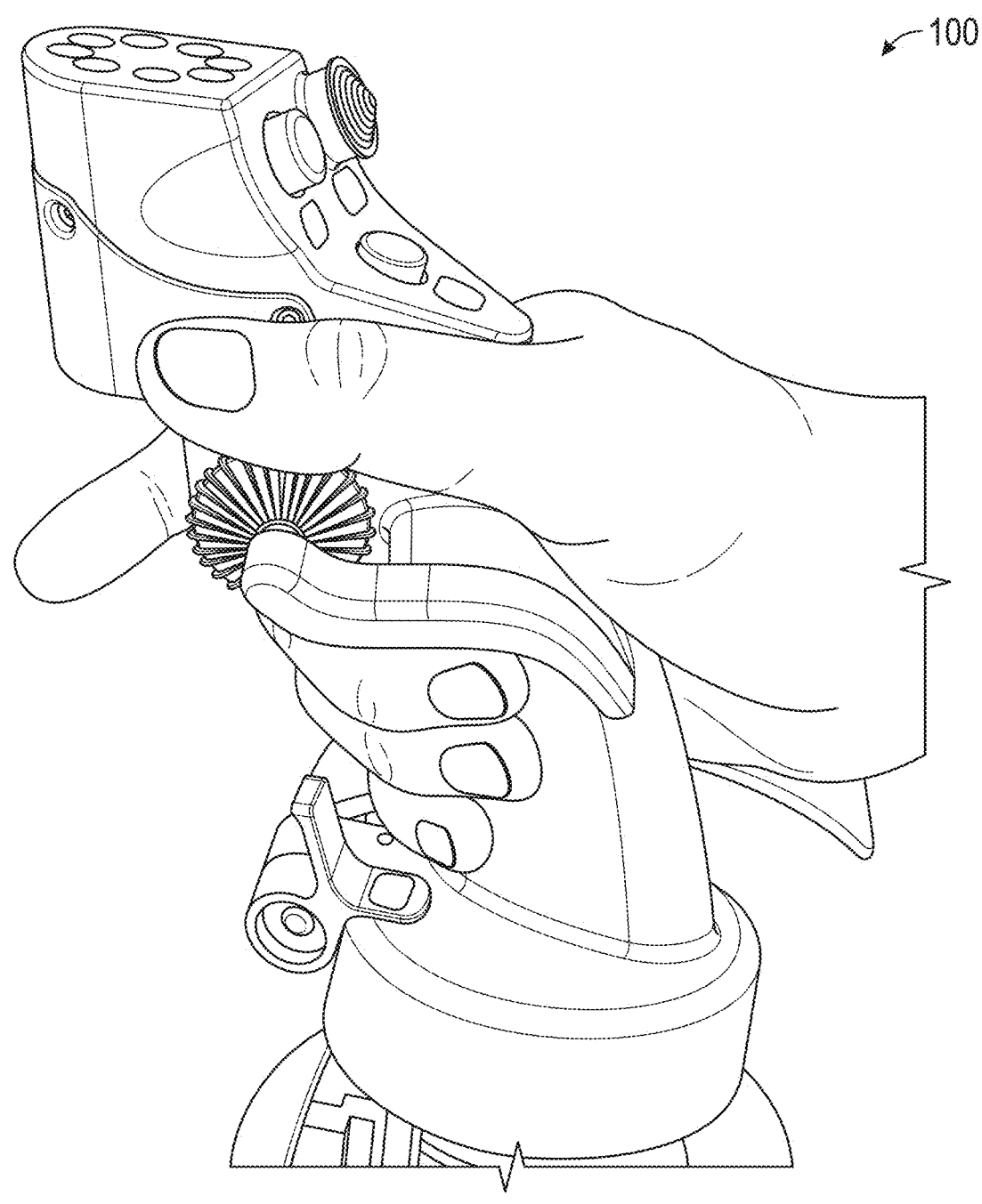
Figure 22D:
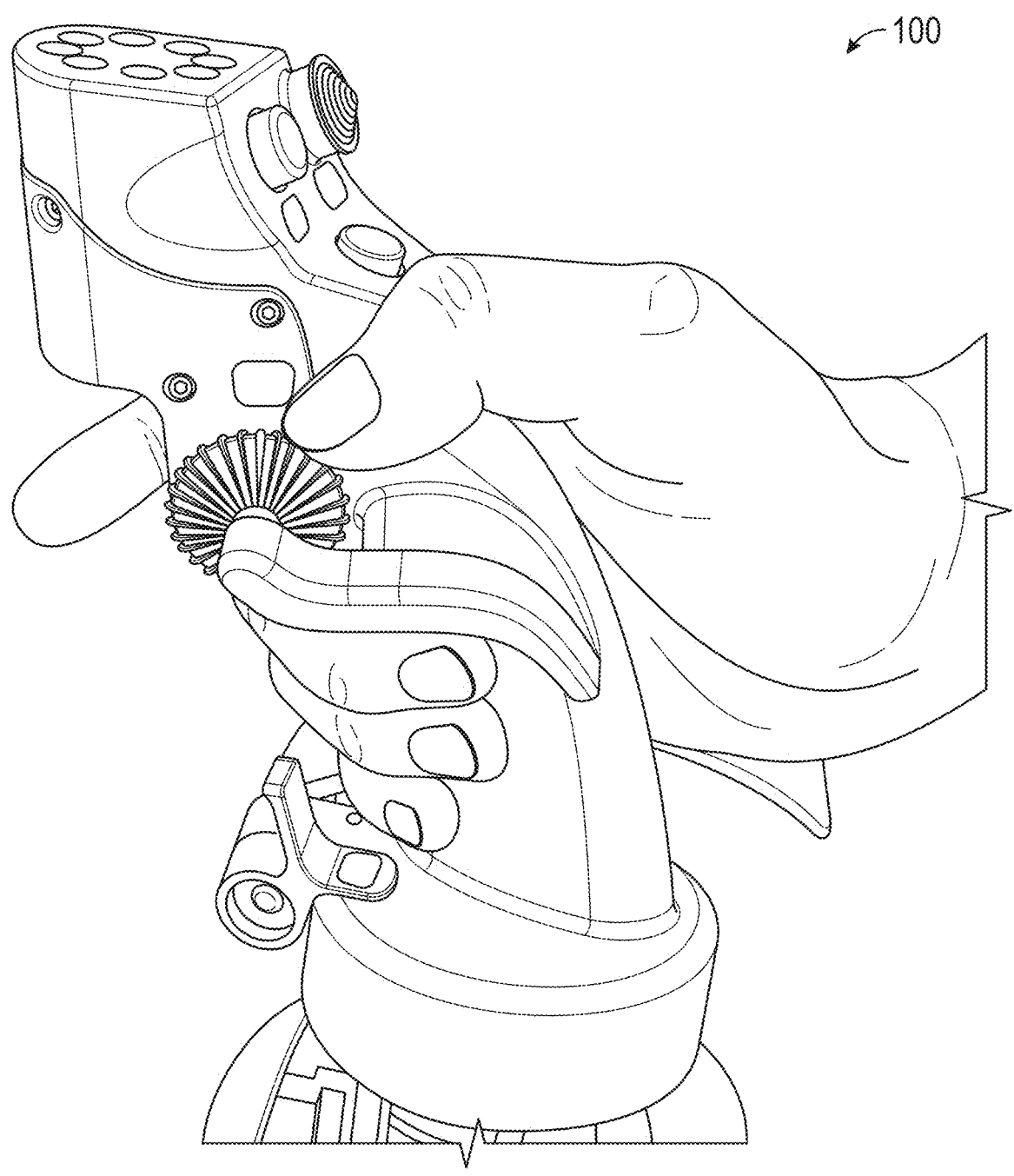

In a first variant, the X-axis, Y-axis, and/or Z-axis can be manipulated without the use of the thumb (an example is shown in FIG. 22A), without the activation of thenar eminence, with the thumb in a relaxed or neutral position, and/or with the fingers in a relaxed, neutral, extended, retracted or other configuration. In a first specific example, the X-axis can be manipulated without requiring the involvement of the thumb, index finger, and/or middle finger, leaving them free for executing other controls, positioning them to execute other controls, and/or allowing them to concurrently execute other controls. In a second specific example, the Y-axis can be manipulated without requiring the involvement of the thumb, index finger, and/or middle finger, leaving them free for executing other controls, positioning them to execute other controls, and/or allowing them to concurrently execute other controls. In a third specific example, the Z-axis can be manipulated without requiring the involvement of the thumb, index finger, and/or middle finger, leaving them free for executing other controls, positioning them to execute other controls, and/or allowing them to concurrently execute other controls. In a fourth specific example: the X, Y, and Z axes can be controlled with the thumb located in the thumb groove (e.g., in a neutral position), index finger in the first finger groove (e.g., in a neutral position), and/or middle finger in the second finger groove (e.g., in a neutral position).

Figure 25:
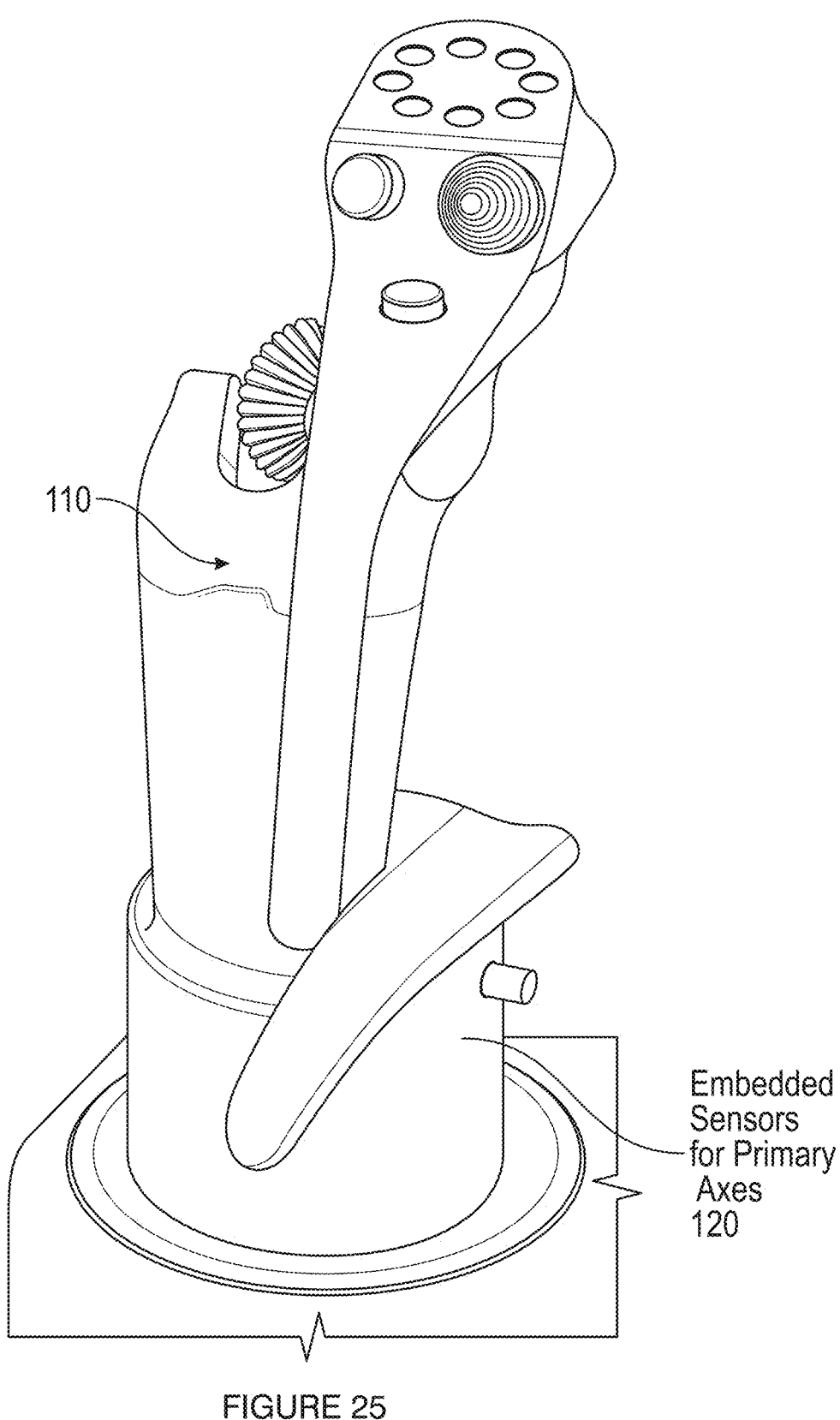
FIG. 25 is an orthogonal view of a variant of the system 100.
Figures 26A, 26B, 26C:
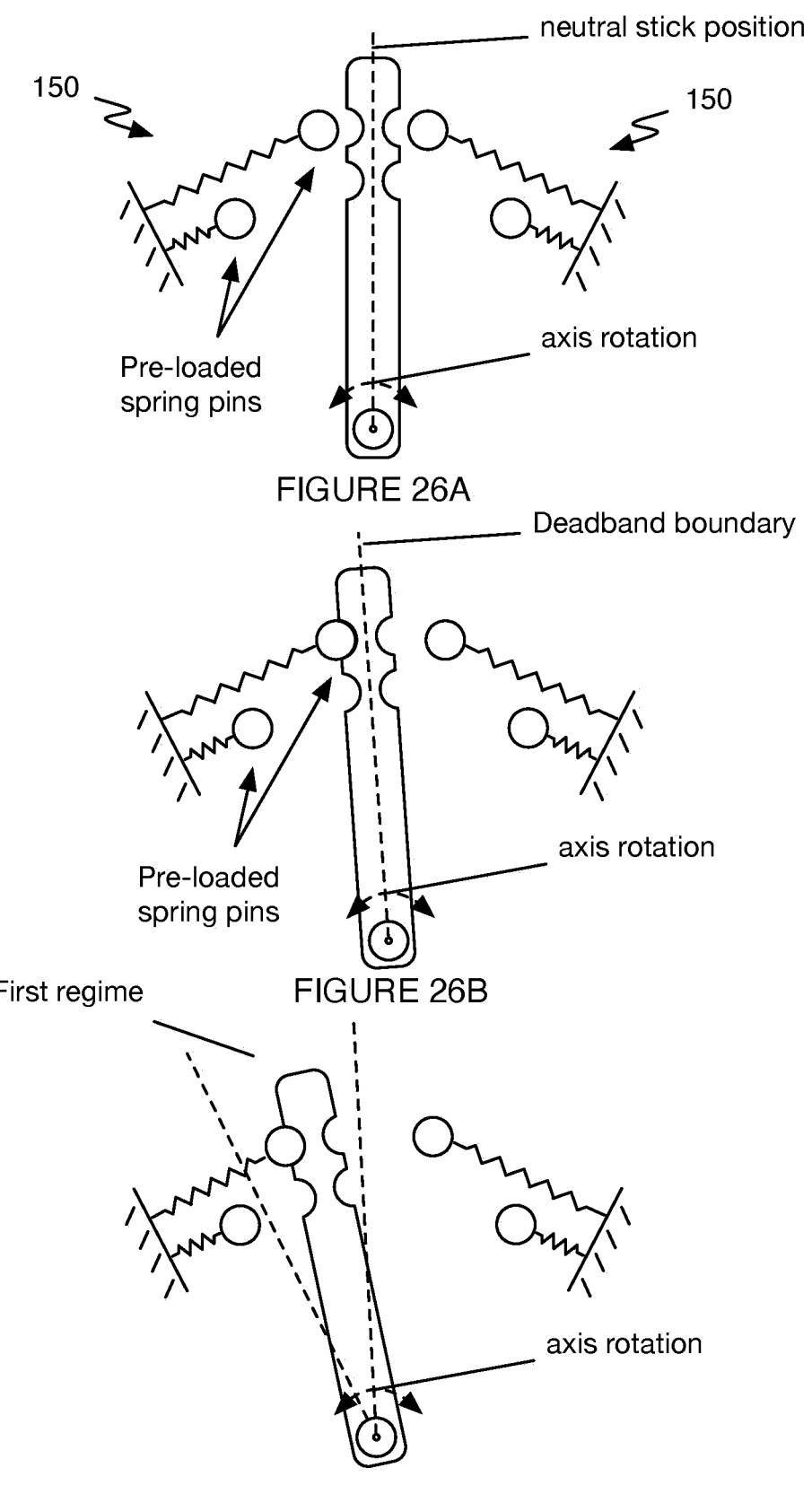
FIG. 26A to FIG. 26E are diagrammatic representations of a variant of an inceptor axis including a soft-stop.
Figure 26D:
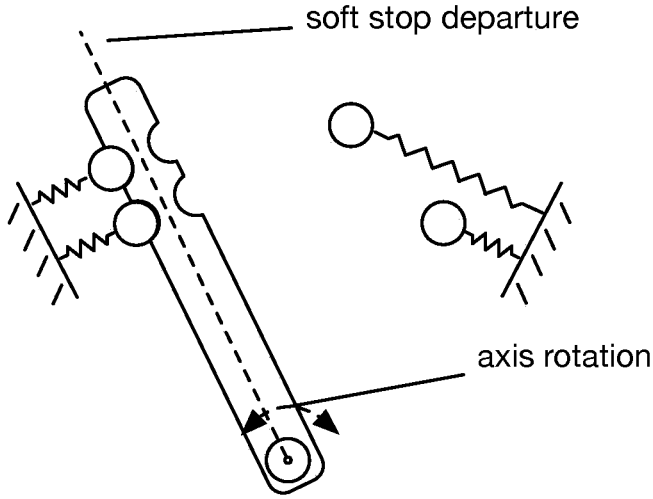
Figure 26E:
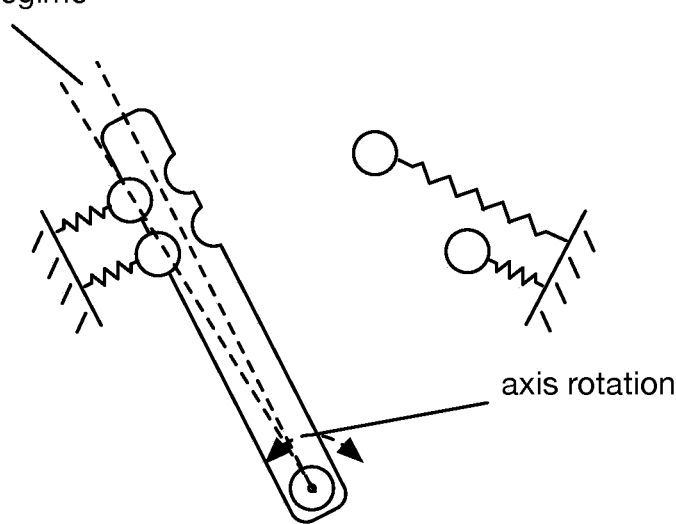

In a second variant, the X-axis, Y-axis, and/or Z-axis can be manipulated with only the small finger and/or palm of the pilot's hand—which is preferably the pilot's right hand (an example of a right hand inceptor is shown in FIG. 25), but can alternately be the pilot's left hand, either hand, and/or both hands.

Figure 19:
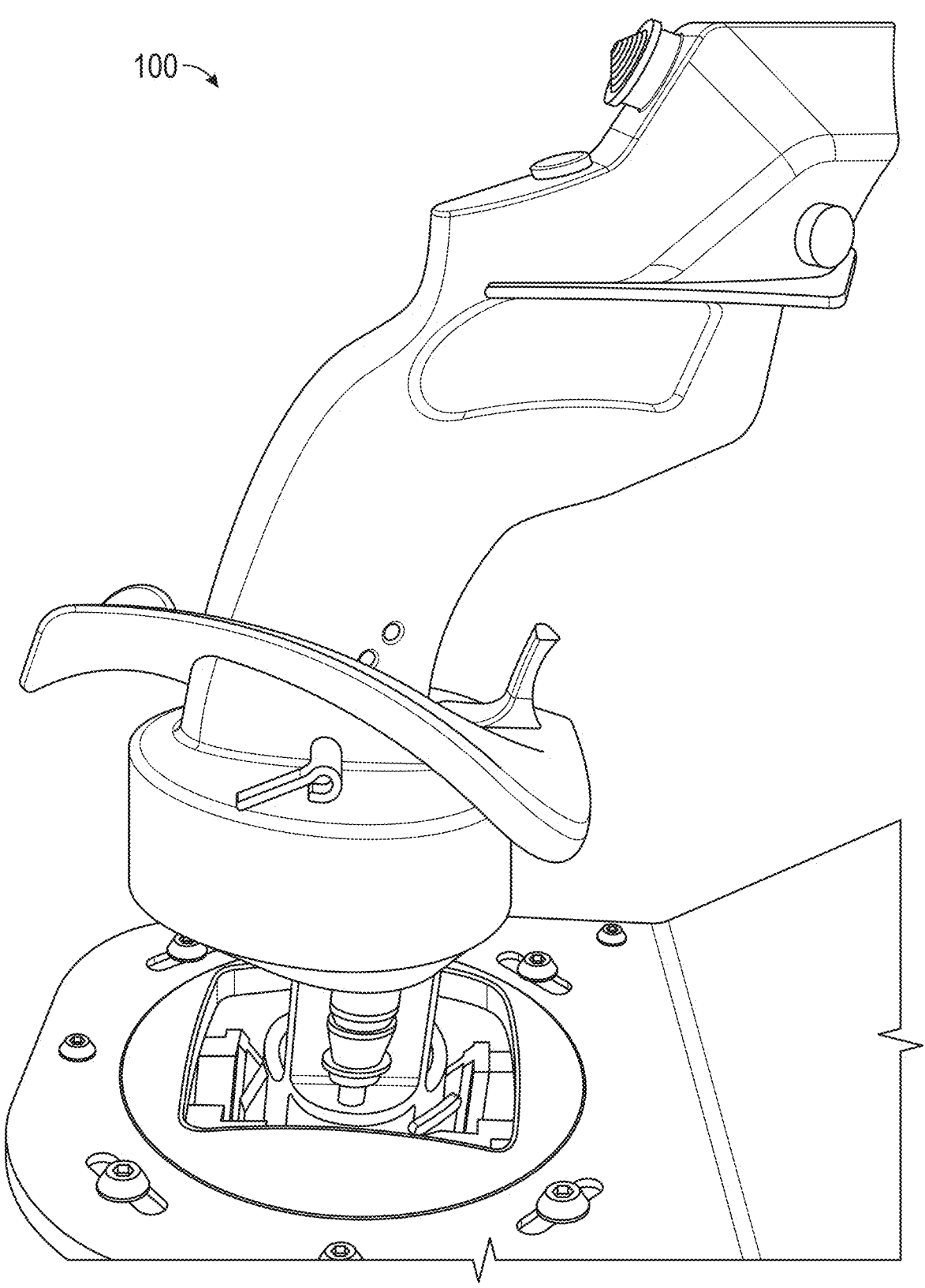
FIG. 19 is a side view image of a variant of the system 100.
Figure 20:
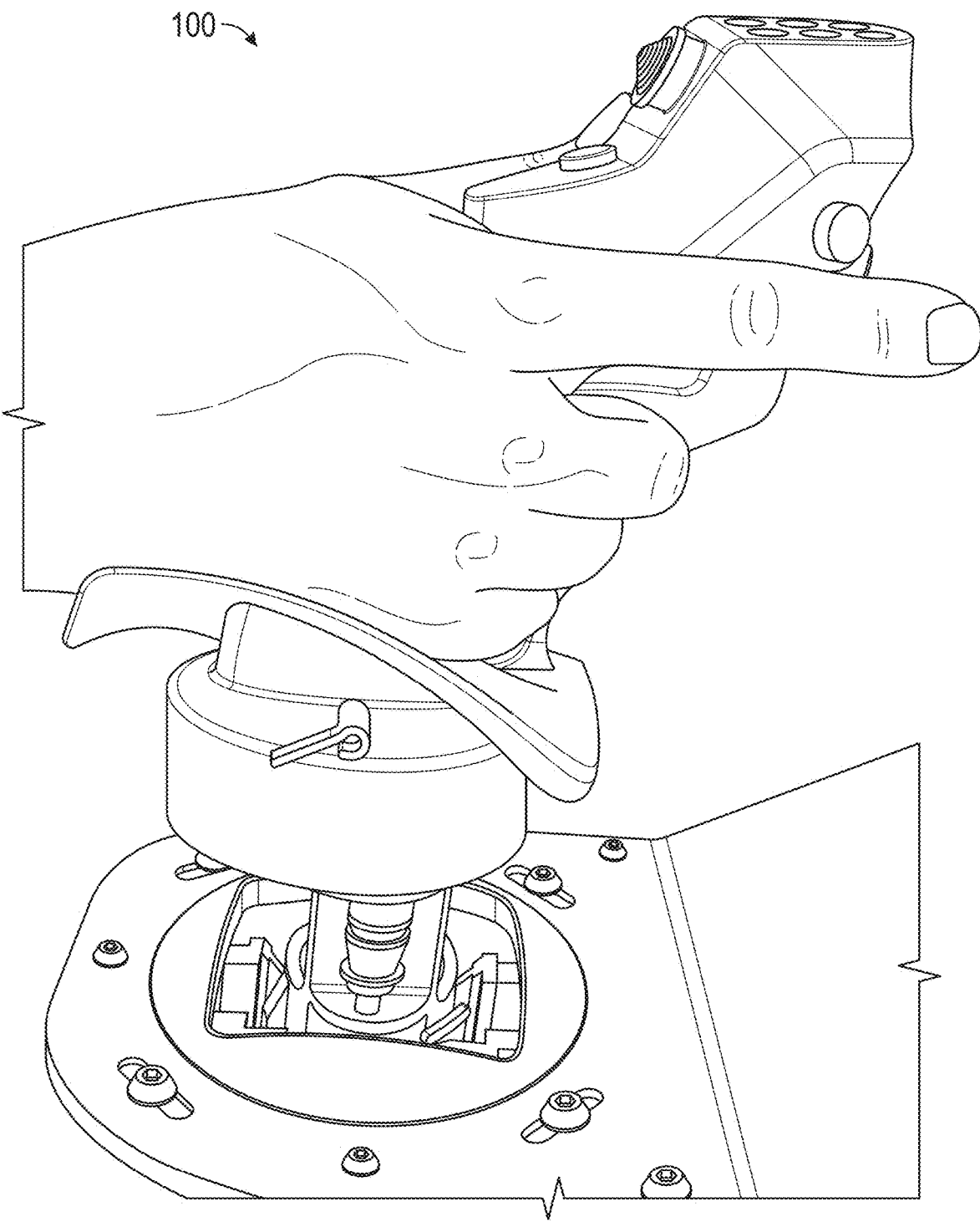
FIG. 20 is a side view image of a variant of the system 100 illustrating an example hand placement relative to the inceptor.
Figure 21:
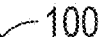
FIG. 21 is an isometric view image of a variant of the system 100.
Figure 21:
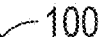
Figure 24:
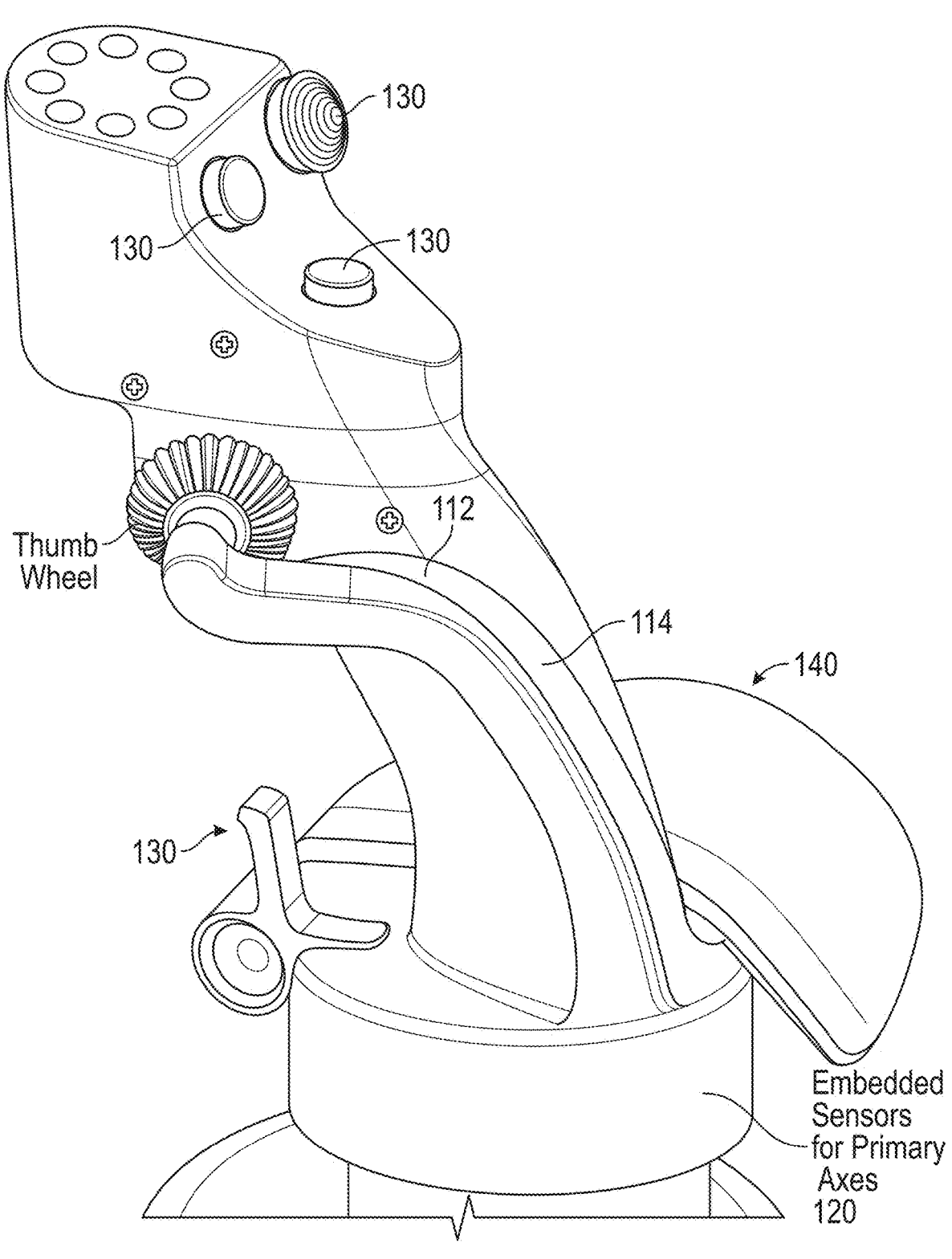
FIG. 24 is an orthogonal view of a variant of the system 100.

First, second, and third specific examples of an inceptor are shown in FIG. 19, FIG. 21 and FIG. 24, respectively.

In variants, the system can include two inceptors (e.g., wherein helicopter-analogous actions are associated with a right-hand inceptor, wherein airplane-analogous actions are associated with a left-hand inceptor, vice versa, etc.). In another example, the system can include two inceptors, wherein a first inceptor is operable in a first flight regime (e.g., hover) and the second inceptor is operable in a second flight regime (e.g., airplane), and both inceptors are operable (e.g., in a redundant manner, in a non-redundant manner, etc.) in a transition flight regime. In additional or alternative variations, the unified command system can have a single inceptor. However, the input mechanism can additionally or alternatively include any suitable number of inceptors.

Inceptor(s) can be left-handed (e.g., designed to engage left hand of user, positioned on the left of the user, include the hand rest on the left side of the grip, etc.), right-handed, two-handed, symmetric (e.g., operated with either hand), and/or otherwise configured. In a specific example, the system can include a primary inceptor (e.g., with a right-handed grip; including a twist and/or Z-axis; having at least 3 primary axes) and a side-stick inceptor (e.g., with a left-handed grip; including the A-axis).

Figure 15B:
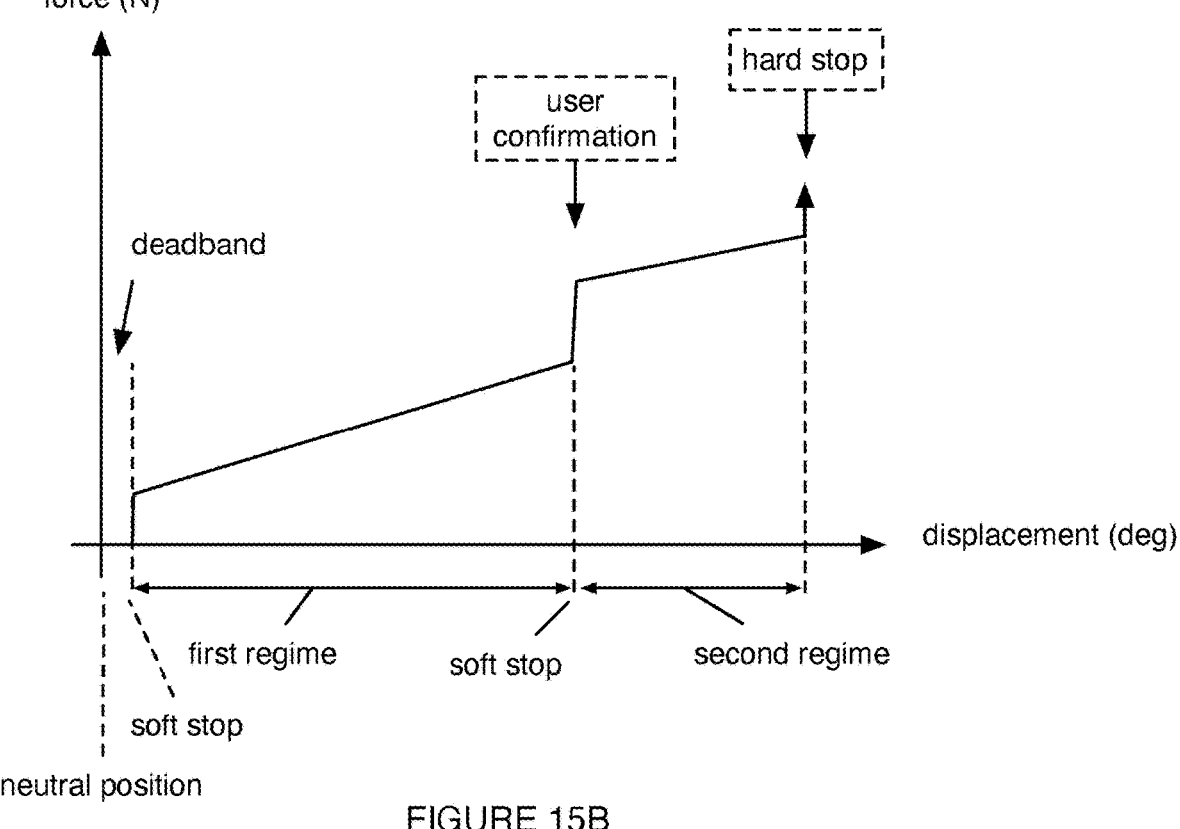
FIG. 15B is a displacement versus force graph for an axis of an inceptor which includes a soft stop in a variant of the system.

One or more axes/inputs of the inceptor can include a deadband (or dead zone), which functions for avoid processing small departures from the neutral position (e.g., related to mechanical or sensor bias, incidental disturbances, etc.; an example is shown in FIG. 15B). Deadbands can be symmetric or asymmetric ranges about the neutral position. Deadbands can be predetermined, dynamically determined, configured by the user/pilot, and/or otherwise implemented. Deadbands can be implemented in conjunction with a mechanical hardware mechanism, such as soft-stops at the boundaries of the deadband (e.g., for small displacements in opposing directions relative to the neutral position of the inceptor). Deadbands can additionally or alternatively include an input threshold, where departures below the threshold force/displacement are neglected. In a specific example, the sensor threshold for a deadband can exceed the magnitude of breakout force/displacement by at least a predetermined margin of sensor error. However, the axes can include any other suitable deadbands and/or otherwise exclude deadbands.

The inceptor and/or one or more axes/inputs of the inceptor can be self-centering (returning to a neutral position by default), not self-centering (remain in a departed position), or otherwise suitably implemented.

The inceptor can be active or passive: it can provide force feedback (e.g., dynamically resist motion in one or more axes, vibrate, etc.), provide no force feedback, be configurable to provide force feedback (e.g., by a user/pilot), or otherwise operate.

In variants, the inceptor can include one or more endpoints of the haptic feedback mechanism, include a motor of the haptic feedback mechanism (e.g., for a passive inceptor), provide no haptic feedback, and/or be otherwise configured.

In variants, the inceptor can be located offboard the aircraft (such as for remotely piloted and/or unmanned aircrafts), can operate as part of a flight simulation, be a line replaceable unit (LRU), can be removable from the aircraft, can wirelessly communicate with the aircraft, and/or otherwise operate.

The aircraft control system 100 can include a haptic feedback mechanism which functions to communicate with the pilot via transmission of force. The haptic feedback mechanism can include one or more vibration mechanisms, which can function to alert the user by vibration of a haptic endpoint (such as an arm rest, the inceptor, seat, etc.). The vibration mechanism can alert the user and/or generate vibrations of any particular frequency, amplitude, and/or pattern of variation in frequency and/or amplitude. Vibrations can be generated by an eccentric rotating mass (ERM), linear resonant actuator (LRA), ultrasound beams (focal point localized on hand or finger without physical contact), and/or any other suitable device/mechanism. The vibration mechanism can be located inside the inceptor, at the top of the inceptor grip, in the middle of the inceptor grip, at the base of the inceptor grip, at a mounting surface of the inceptor or grip, at the hand rest mounting and/or pivot point, at the arm rest, and/or in any other suitable location. The vibration mechanism can operate at any suitable frequency, which can be <0.4 Hz, 0.4 Hz, 1 Hz, 10 Hz, 50 Hz, 100 NZ, 200 Hz, 400 Hz, 800 Hz, >800 Hz, any range bounded by the aforementioned values, and/or any other suitable frequency. The vibration mechanism can operate with any normalized amplitude, which can be <2 G, 2 G, 5 G, 10 G, 15 G, 50 G, 100 G, >100 G, any range bounded by the aforementioned values, and/or any other suitable normalized amplitude. In a first variant, a single actuator (or single vibration mechanism) vibrates the inceptor grip. In a second variant, there is one vibration mechanism per axis of the inceptor. In a third variant, there is one force feedback mechanism per axis of the inceptor.

Figure 7:
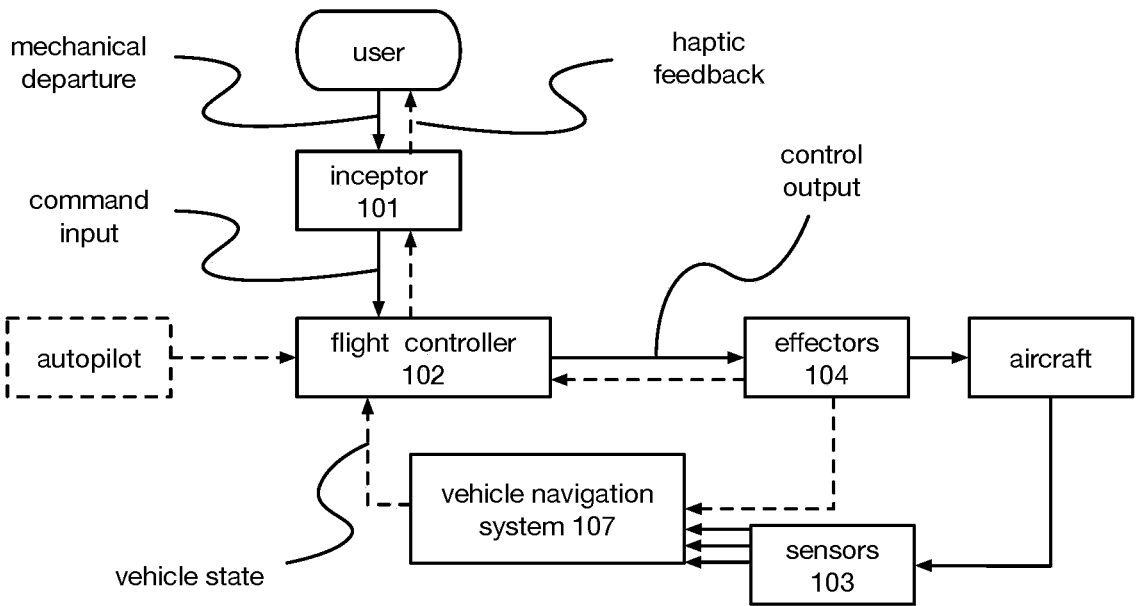
FIG. 7 depicts an example integration of a variant of the system in an aircraft.
Figure 12:
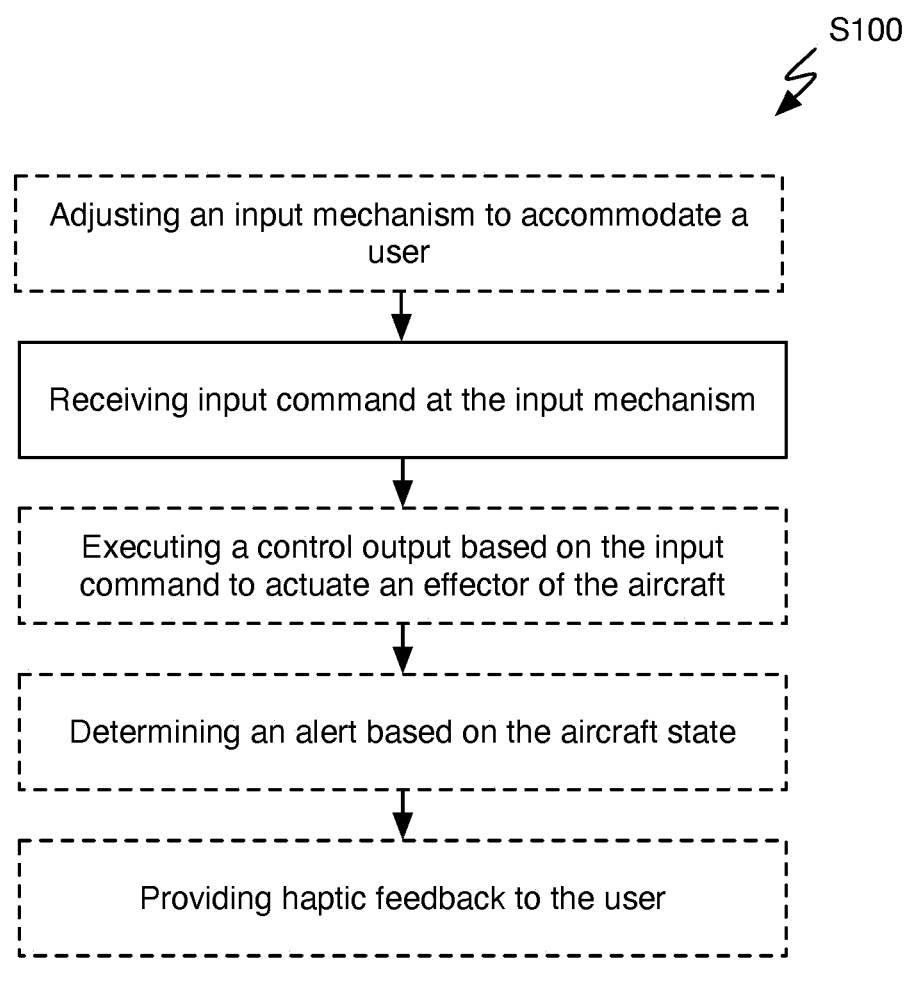
FIG. 12 is a flowchart diagram of a variant of the method.

Haptic feedback mechanism and/or vibration mechanisms can communicate alerts to the pilot via an active or passive inceptor, and can be configured to generate haptic alerts related to one or more sensors or vehicle states (an example is shown in FIG. 12). In specific example, the haptic feedback mechanism can be controlled by the flight controller 102 based on the vehicle state (an example is shown in FIG. 7) as determined by the vehicle navigation system (VNS) 107 as described in U.S. application Ser. No. 16/721, 523, filed 19 Dec. 2019, which is incorporated herein in its entirety by this reference. Haptic feedback mechanism alerts can include sensor alerts (fuel level, range alert, cabin temperature, battery temperature, cabin pressure, etc.), collision avoidance alerts, autopilot or augmented mode alerts, traffic alerts, crew alerting systems (CAS), command model alerts, system health alerts, mode change alerts, general pilot alerts, and/or other suitable alerts.

Haptic feedback mechanism and/or vibration mechanisms can communicate alerts in decreasing order of priority/urgency and/or can communicate differing haptic alerts concurrently. In an example, haptic alerts can be communicated concurrently if a first alerts correspond to lower amplitude and/or lower frequency, and a second alert corresponds to higher amplitude, higher frequency, and/or a pattern, wherein the second alert is higher priority than first alert. Alternately, concurrent alerts can be sent to different haptic endpoints, communicated serially, or not be communicated (e.g., if lower priority).

Haptic alerts and/or vibrations can be communicated by any suitable vibration patterns, such as: uniformly maintain vibration characteristics (e.g., motor RPM) until alert is resolved, periodically engage/disengage a motor of the vibration mechanism, rapidly accelerate and/or decelerate the motor, communicate similar to Morse-code patterns (combination of dashes and dots, etc.), and/or generate any other suitable vibration patterns. Preferably, each vibration pattern corresponds to a distinct alert, however, a vibration pattern can correspond to multiple alerts, indicate that the pilot should look at a display (or other system specifying the alert type), correspond only to alter severity, correspond only to alert type, correspond to both alert type and severity, and/or otherwise suitably communicate with the user. There are preferably between 3 and 8 different haptic alert patterns associated, which maximizes the amount of haptic communication while maintaining a reasonably low cognitive load, but there can alternately be any suitable number of haptic alert types available.

However, the haptic feedback mechanism and/or vibration mechanism can be otherwise suitably implemented.

Figure 14:
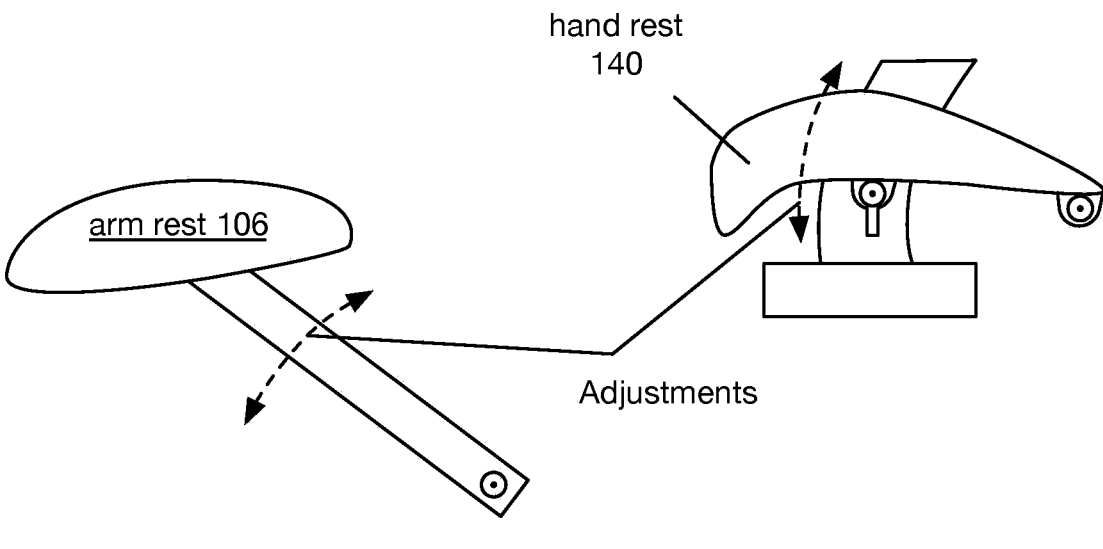
FIG. 14 is a schematic representation of a variant of the system.

The aircraft control system 100 can optionally include an arm rest 106 which functions to support the pilot's arm during manipulation of the inceptor. The arm rest 106 can be adjustable (infinite adjustment or finite adjustment) or static (e.g., fixed in place). In some variants, the arm rest 106 can be adjustable (an example is shown in FIG. 14) which may allow it to be adjusted such that in a neutral position of the wrist and/or inceptor, a contact point of the forearm on the arm rest 106 subtsantially aligned with a contact point of the hand blade against the hand rest, however the forearm can alternately be angled relative to the hand when contacting the arm rest 106, and/or otherwise adjusted. The arm rest can be manufactured from any suitable material, and can include a rubber coating or other padding for improved comfort. The arm rest can be flat, curved, arcuate, or have any other suitable geometry. Preferably, the arm rest is arranged to support the user's forearm, with the upper surface of the arm rest is in plane with the hand rest. The arm rest can be connected to the hand rest and/or inceptor, or mounted separately to a dashboard, pilot seat, and/or otherwise suitably mounted. The arm rest can optionally be connected to and/or include a vibration mechanism, and serve as a haptic feedback endpoint—which can communicate the same haptic alerts as the inceptor and/or different haptic alerts. However, the arm rest can otherwise be suitably implemented.

The aircraft control system 100 can include a flight controller which functions to receive command input from the input mechanisms and optionally, the one or more sensors, and functions generate control output(s) to affect the state of one or more effectors of the aircraft (e.g., to control the aerodynamic forces and/or moments on the aircraft, an example is shown in FIG. 7). The flight processor can also function to implement a unified command model as described in U.S. application Ser. No. 16/708,367, filed 9 Dec. 2019, which is incorporated in its entirety by this reference.

Inputs to the flight processor can include user input (e.g., command input) and vehicle state variables (e.g., aircraft position, aircraft positional change rates, forces on the aircraft, moments on the aircraft, speed, airspeed, groundspeed, etc.), guidance inputs (e.g., autopilot commands, waypoints, trajectory plans, flightpath, etc.), the current flight regime, and any other suitable inputs. Outputs (control outputs) from the flight processor can include target effector positions (e.g., angular positions of control surfaces, drive power for effector actuators, encoder states for effector actuators, etc.), and any other suitable outputs. The inputs are translated into outputs collectively by the command model and the control engine executing at the flight processor.

The aircraft control system 100 can include effectors which function to generate and/or adjust aerodynamic forces and/or moments on the aircraft, in response to control outputs received from the flight processor (e.g., generated according to a unified command model based on input received from a user). The effectors can include ailerons, ruddervators, flaps, propulsion units (e.g., tiltable propellers with variable blade pitch), and any other suitable control surfaces and/or actuatable mechanisms that can affect the flight of the aircraft. The effectors can also include actuators that actuate the control surface(s) of the effectors such as one or more: blade pitch mechanism, tilt mechanism, motor (by varying RPM), and/or other suitable actuator(s).

In a specific example, the effectors of the system include ailerons (e.g., 2 on each side of the aircraft), ruddervators (e.g., 3 on each side of the aircraft), flaps (e.g., 2 on each side of the aircraft), and propulsion unit associated effectors (e.g., 6 nacelle tilt actuators, motors with adjustable RPM, and propeller blades with variable pitch). Each effector is preferably associated with and coupled to a single actuator (e.g., a rotary actuator mounted on the hinge line of actuated control surfaces, a variable pitch linkage actuator, etc.) that positions the effector (or increases the rotary power delivered to other effectors, as in the case of the motor) in response to control output received from the flight processor. However, each effector can additionally or alternatively be associated with any suitable number of actuators.

The aircraft control system 100 can include one or more sensors to measure aircraft parameters which can be used to determine vehicles state and/or flight regime. Sensors can include fuel level, battery monitoring (e.g., SoC, voltage, power draw), air data sensors, temperature sensors (e.g., interior or exterior), altimeter, barometer, airspeed sensors, spatial sensors, proximity sensors, location sensors (e.g., GPS, GNSS, triangulation, trilateration, etc.), force sensors (e.g., strain gauge meter, load cell), and/or any other suitable sensors.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

The invention claimed is:

1. A system for receiving inputs from a user of an aircraft, the system comprising:

an inceptor mount defining a neutral position, a base plane, and a plurality of primary axes comprising a twist axis orthogonal to the base plane;

a grip connected to the inceptor mount at a first end, a length of the grip extending from the first end to a distal end;

one or more input components mounted to the grip proximal to the distal end; and for each primary axis:

a passive force-feedback mechanism mechanically coupled to the inceptor mount about the primary axis, the passive force-feedback mechanism configured to provide varying displacement resistance based on a departure of the grip from the neutral position along the primary axis, the passive force-feedback mechanism providing a dead-band threshold corresponding to a breakout torque in each primary axis, wherein the breakout torque of the twist axis is at least double the breakout torque of each of a remainder of the primary axes; and a sensor coupled to the inceptor mount and configured to determine an input along the axis based on the departure.

2. The system of claim 1 further comprising a hand rest coupled to the grip and comprising a dorsal flange, the dorsal flange extending from a nadir section of the hand rest away from the base plane, wherein the hand rest is anticlastic and wherein the hand rest is configured to engage an ulnar border of a hand of the user while a plurality of fingers of the hand grasp the grip and a dorsal side of the hand contacts the dorsal flange.

3. The system of claim 2, wherein the grip further comprises a finger groove defined in a side of the grip and extending between a front side and a back side of the grip.

4. The system of claim 2, wherein the hand rest defines a proximal side of the grip and a distal side of the grip, wherein the distal side of the grip comprises a pair of grip edges extending along a portion of the length of the grip, the pair of grip edges configured to engage pads of the plurality of fingers crosswise.

5. The system of claim 1, wherein the grip further comprises at least one finger groove defined in a side of the grip and extending between a front side and a back side of the grip.

6. The system of claim 5, wherein the grip further comprises a fingertip contact pad at a terminal end of the at least one finger groove.

7. The system of claim 5, wherein the at least one finger groove comprises a first finger groove and a second finger groove located below the first finger groove on the grip, a first user input located an end of the first finger groove and a second user input located at an end of the second finger groove.

8. The system of claim 1, wherein the passive force-feedback mechanism of each primary axis is spring-loaded to self-center at within the dead-band threshold of the neutral position.

9. The system of claim 1, further comprising a thenar rest protruding from the grip and extending between the first end and the distal end along a partial length of the grip, the thenar rest defining a groove configured to receive a thenar eminence of a hand.

10. The system of claim 9, wherein the grip further comprises a textured fingertip contact pad opposing the groove of the thenar rest across a thickness of the thenar rest.

11. The system of claim 1, wherein the passive force-feedback mechanism comprises a soft stop along each axis, wherein exceeding a torque threshold of the soft stop comprises a pilot confirmation.

12. The system of claim 1, further comprising a unitary haptic feedback mechanism mechanically coupled to the inceptor mount and configured to communicate alerts associated with each of the primary axes.

13. The system of claim 12, wherein the unitary haptic feedback mechanism is configured to provide multiple alerts simultaneously.

14. The system of claim 1, wherein the grip is configured to be articulated in each primary axis without use of a thumb or an index finger.

15. A system for receiving inputs from a user for an aircraft, the system comprising:

an inceptor mount defining a neutral position, a base plane, and a plurality of primary axes comprising a twist axis orthogonal to the base plane;

a grip connected to the inceptor mount at a first end, a length of the grip extending from the first end to a distal end, wherein the grip is configured to be grasped by third, fourth, and fifth digits of a hand of the user with a thumb and a second digit of the hand free;

a plurality of input components mounted to the grip proximal to the distal end and configured to receive inputs from a thumb and the second digit of the hand; and for each primary axis, a passive force-feedback mechanism mechanically coupled to the inceptor mount about the primary axis, the passive force-feedback mechanism configured to provide varying displacement resistance based on a departure of the grip from the neutral position along the primary axis, the passive force-feedback mechanism providing a dead-band threshold corresponding to a breakout torque in each primary axis, wherein the breakout torque of the twist axis is at least double the breakout torque of each of a remainder of the primary axes.

16. The system of claim 15, wherein the grip further comprises at least one finger groove defined in a side of the grip and extending between a front side and a back side of the grip.

17. The system of claim 16, wherein the grip further comprises a textured fingertip contact pad at a terminal end of the at least one finger groove to facilitate twisting of the grip.

18. The system of claim 16, wherein the at least one finger groove comprises a first finger groove and a second finger groove located below the first finger groove on the grip, a first user input located an end of the first finger groove and a second user input located at an end of the second finger groove.

19. The system of claim 15, further comprising a hand rest coupled to the grip and comprising a dorsal flange, the dorsal flange extending from a nadir section of the hand rest away from the base plane, wherein the hand rest is anticlastic and wherein the hand rest is configured to engage an ulnar border of a hand of the user while the digits of the hand grasp the grip and a dorsal side of the hand contacts the dorsal flange.

20. The system of claim 15, further comprising a thenar rest protruding from the grip and extending between the first end and the distal end along a partial length of the grip, the thenar rest defining a groove configured to receive a thenar eminence of a hand.

* * * * *